United States Patent
Kawasaki et al.

(10) Patent No.: US 11,265,838 B2
(45) Date of Patent: Mar. 1, 2022

(54) USER EQUIPMENT, CONTROL DEVICE, AND COMMUNICATION CONTROL METHOD

(71) Applicants: SHARP KABUSHIKI KAISHA, Sakai (JP); FG Innovation Company Limited, Tuen Mun (HK)

(72) Inventors: Yudai Kawasaki, Sakai (JP); Masafumi Aramoto, Sakai (JP)

(73) Assignees: SHARP KABUSHIKI KAISHA, Osaka (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 17/295,038

(22) PCT Filed: Nov. 15, 2019

(86) PCT No.: PCT/JP2019/044797
§ 371 (c)(1),
(2) Date: May 18, 2021

(87) PCT Pub. No.: WO2020/105548
PCT Pub. Date: May 28, 2020

(65) Prior Publication Data
US 2021/0360564 A1    Nov. 18, 2021

(30) Foreign Application Priority Data

Nov. 19, 2018  (JP) ................ JP2018-216497

(51) Int. Cl.
*H04W 60/00* (2009.01)
*H04W 48/16* (2009.01)

(52) U.S. Cl.
CPC ........... *H04W 60/00* (2013.01); *H04W 48/16* (2013.01)

(58) Field of Classification Search
CPC ..... H04W 76/12; H04W 60/00; H04W 48/18; H04W 76/11; H04W 76/10; H04W 8/18;
(Continued)

(56) References Cited

U.S. PATENT DOCUMENTS

| | | | |
|---|---|---|---|
| 2018/0279397 A1 | 9/2018 | Faccin et al. | |
| 2019/0349742 A1* | 11/2019 | Kim | .............. H04W 4/24 |
| 2020/0120751 A1 | 4/2020 | Sugawara et al. | |

FOREIGN PATENT DOCUMENTS

| | | | |
|---|---|---|---|
| CN | 107820300 A | 3/2018 | |
| WO | 2018/207837 A1 | 11/2018 | |
| WO | WO-2019137286 A1 * | 7/2019 | ............ H04W 48/20 |

OTHER PUBLICATIONS

3GPP TS 23.501 v15 3.0 (Sep. 2018); Technical Specification Group Services and System Aspects; System Architecture for the 5G System; Stage 2 (Release 15).

(Continued)

*Primary Examiner* — Daniel Lai
(74) *Attorney, Agent, or Firm* — ScienBiziP, P.C.

(57) ABSTRACT

Provided is a communication unit for achieving, in a 5GS, in a case that a situation occurs in which information for connectivity to a Local Area Data Network (LADN) requested by a user equipment is not valid, error processing of a control device of a core network and error processing of the user equipment. Provided is a communication unit for achieving, in a 5GS, in a case that a situation occurs in which information for connectivity to a Local Area Data Network (LADN) requested by a user equipment is not valid, error processing in which a control device of a core network rejects the request of the user equipment. Also provided is a communication unit for achieving, in a case that a situation occurs in which information for connectivity to a LADN
(Continued)

requested by a user equipment is not valid, appropriate error processing performed by the user equipment.

8 Claims, 6 Drawing Sheets

(58) Field of Classification Search
CPC ... H04W 24/02; H04W 84/042; H04W 36/08; H04W 36/14; H04W 48/20; H04W 76/22; H04W 24/04; H04W 40/246; H04W 40/24; H04W 40/248; H04W 48/16; H04M 15/8038
See application file for complete search history.

(56) References Cited

OTHER PUBLICATIONS

3GPP TS 23.502 v15 3.0 (Sep. 2018); Technical Specification Group Services and System Aspects; Procedures for the 5G System; Stage 2 (Release 15).
3GPP TS 24.501 v15 1.0 (Sep. 2018); Technical Specification Group Core Network and Terminals; Non-Access-Stratum (NAS) protocol for 5G System (5GS); Stage 3 (Release 15), (Sep. 21, 2018).
LG Electronics: "Clarification on LADN DNN(s) configured in AMF", S2-186508, 3GPP TSG SA WG2 #128 Vilnius, Lithuania, Jul.-Jul. 6, 2018, (Jun. 26, 2018).

* cited by examiner

USER EQUIPMENT, CONTROL DEVICE, AND COMMUNICATION CONTROL METHOD

TECHNICAL FIELD

The present disclosure relates to a user equipment, a control device, and a communication control method. This application claims priority based on JP 2018-216497 filed on Nov. 19, 2018, the contents of which are incorporated herein by reference.

BACKGROUND ART

In the 3rd Generation Partnership Project (3GPP), studies have been initiated on a system architecture of a 5G System (5GS), which is a mobile communication system of the next generation, that is, the fifth generation (5G), and discussions are being held on support of new procedures and new functions (see Non Patent Literature (NPL) 1 and NPL 2).

For example, requirement conditions include optimization and diversification of a communication procedure for supporting a continual mobile communication service depending on various services, optimization of a system architecture suitable for the optimization and diversification of the communication procedure, and the like.

CITATION LIST

Non Patent Literature

NPL 1: 3GPP TS 23.501 v15.3.0 (2018-09); Technical Specification Group Services and System Aspects; System Architecture for the 5G System; Stage 2 (Release 15)

NPL 2: 3GPP TS 23.502 v15.3.0 (2018-09); Technical Specification Group Services and System Aspects; Procedures for the 5G System; Stage 2 (Release 15)

NPL 3: 3GPP TS 24.501 v15.1.0 (2018-09); Technical Specification Group Core Network and Terminals; Non-Access-Stratum (NAS) protocol for 5G System (5GS); Stage 3 (Release 15)

SUMMARY OF INVENTION

Technical Problem

In the 5G System (5GS), in order to provide various services, a 5G Core Network (5GCN), which is a new core network, has been studied. Note that a new function such as a function for providing connectivity to a Local Area Data Network (LADN) is supported in the 5GS.

However, in a case that a situation occurs in which information for connectivity to the LADN requested by a user equipment is not valid, processing of a control device of the core network and processing of the user equipment are not clear.

An aspect of the present invention has been made in view of the circumstances as described above, and an object thereof is, in the 5GS, in a case that a situation occurs in which information for connectivity to a LADN requested by a user equipment is not valid, to provide a method for achieving error processing of a control device of a core network and error processing of the user equipment.

Solution to Problem

A User Equipment (UE) according to an embodiment of the present invention is a UE including a transmitting and receiving circuitry and a controller, in which the transmitting and receiving circuitry is configured to transmit, to a control device in a core network, a registration request message including a Local Area Data Network (LADN) indication information element; and receive, from the control device, a registration accept message including a LADN information element, and the controller is configured to consider a LADN Data Network Name (DNN) to be unavailable in a case that the number of a plurality of the LADN DNNs which are included in the LADN indication information element and not included in the LADN information element is equal to or greater than one.

A control device according to an embodiment of the present invention is a control device in a core network including a transmitting and receiving circuitry, in which the transmitting and receiving circuitry is configured to receive, from a User Equipment (UE), a registration request message including a Local Area Data Network (LADN) indication information element, transmit, to the UE, a registration accept message including a LADN information element, and include a LADN Data Network Name (DNN) determined in the LADN information element, in which the UE considers a LADN DNN to be unavailable in a case that the number of a plurality of the LADN DNNs which are included in the LADN indication information element and not included in the LADN information element is equal to or greater than one.

A communication control method performed by a User Equipment (UE) according to an embodiment of the present invention, the communication control method including the steps of transmitting, to a control device in a core network, a registration request message including a Local Area Data Network (LADN) indication information element; and receiving, from the control device, a registration accept message including a LADN information element, in which the UE considers a LADN Data Network Name (DNN) to be unavailable in a case that the number of a plurality of the LADN DNNs which are included in the LADN indication information element and not included in the LADN information element is equal to or greater than one.

A communication control method of a control device according to an embodiment of the present invention is a communication control method performed by a control device included in a core network, the communication control method including the steps of: receiving, from a User Equipment (UE), a registration request message including a Local Area Data Network (LADN) indication information element; transmitting, to the UE, a registration accept message including a LADN information element; and including a LADN Data Network Name (DNN) determined in the LADN information element, in which the UE considers a LADN DNN to be unavailable in a case that the number of a plurality of LADN DNNs which are included in the LADN indication information element and not included in the LADN information element is equal to or greater than one.

Advantageous Effects of Invention

According to an aspect of the present invention, in the 5GS, in a case that a situation occurs in which information for connectivity to a LADN requested by a user equipment is not valid, it is possible to achieve error processing of a control device of a core network and error processing of the user equipment.

DESCRIPTION OF EMBODIMENTS

A preferred embodiment for carrying out the present invention will be described with reference to the drawings.

1. Overview of System

Figure 1:
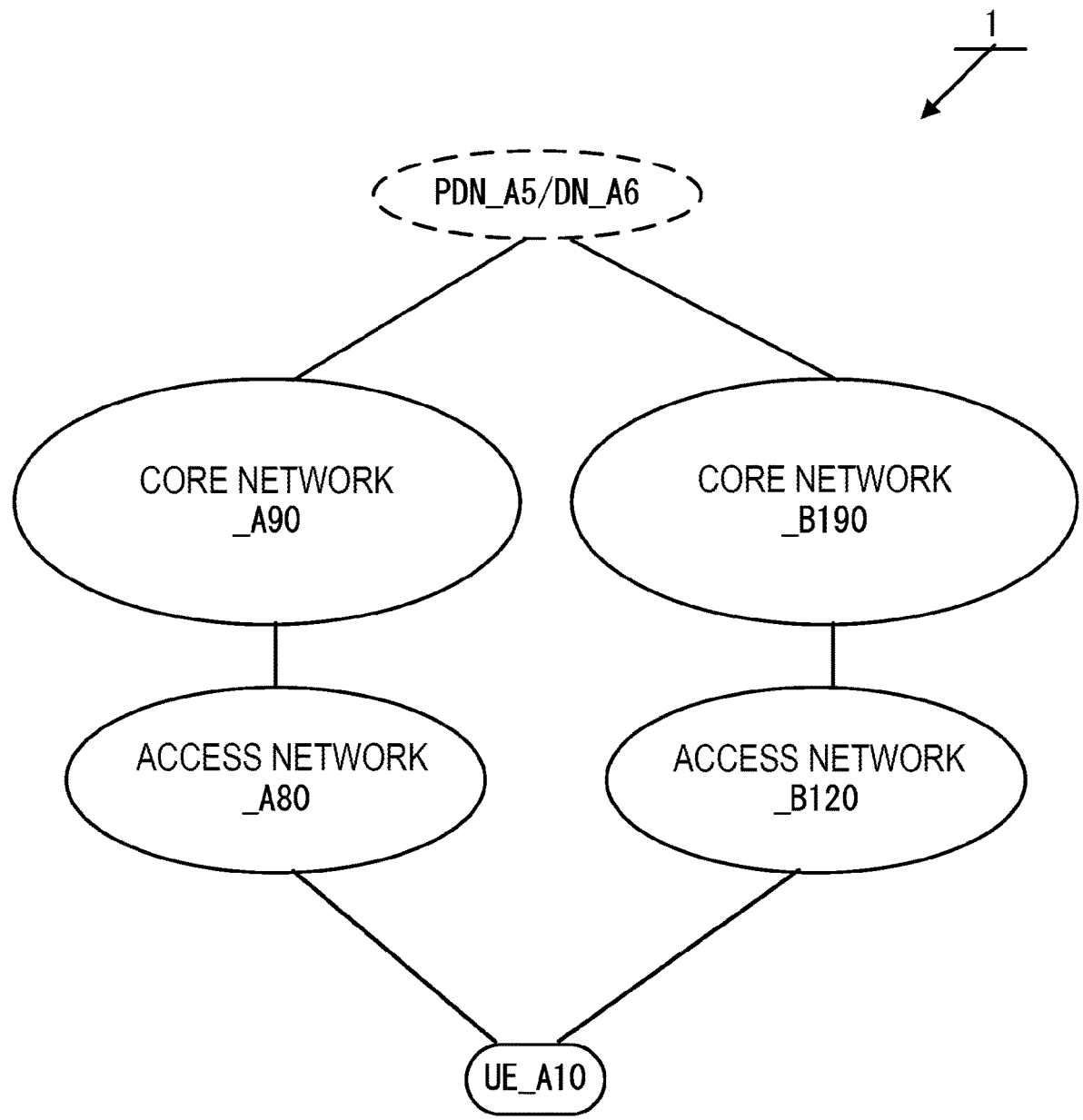
FIG. 1 is a diagram illustrating an overview of a mobile communication system (EPS/5GS).
Figure 2:
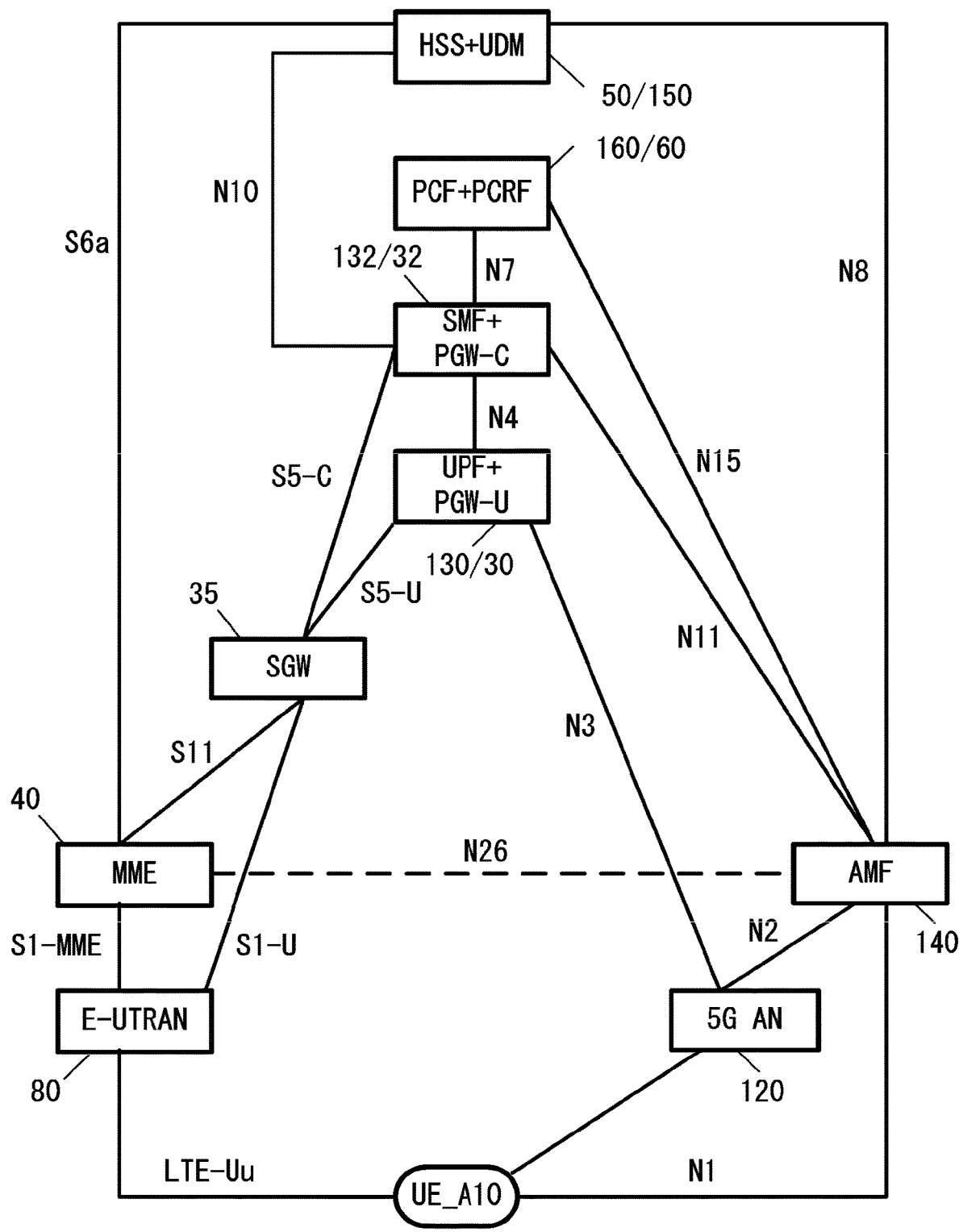
FIG. 2 is a diagram illustrating a detailed configuration of the mobile communication system (EPS/5GS).

First, FIG. 1 is a diagram for illustrating an overview of a mobile communication system 1 used in each embodiment, and FIG. 2 is a diagram for illustrating a detailed configuration of the mobile communication system 1.

FIG. 1 illustrates that the mobile communication system 1 includes a UE_A 10, an access network_A 80, a core network_A 90, a Packet Data Network (PDN)_A 5, an access network_B 120, a core network_B 190, and a Data Network (DN)_A 6.

In the following description, these apparatuses and functions are described, in some cases, as the UE, the access network_A, the core network_A, the PDN, the access network_B, the core network_B, the DN, and the like, by omitting the reference numerals.

Furthermore, in FIG. 2, apparatuses and functions such as the UE_A 10, an E-UTRAN 80, an MME 40, an SGW 35, a PGW-U 30, a PGW-C 32, a PCRF 60, an HSS 50, a 5G AN 120, an AMF 140, a UPF 130, an SMF 132, a PCF 160, and a UDM 150, and interfaces that connect these apparatuses and functions to one another are illustrated.

In the following description, these apparatuses and functions are described, in some cases, as the UE, the E-UTRAN, the MME, the SGW, the PGW-U, the PGW-C, the PCRF, the HSS, the 5G AN, the AMF, the UPF, the SMF, the PCF, the UDM, and the like, by omitting the reference numerals.

Note that the Evolved Packet System (EPS), which is the 4G system, includes the access network_A and the core network_A, but may further include the UE and/or the PDN. Furthermore, the 5G System (5GS), which is the 5G system, includes the UE, the access network_B, and the core network_B, but may further include the DN.

The UE is an apparatus that can connect to a network service via 3GPP access (also referred to as a 3GPP access network or a 3GPP AN) and/or non-3GPP access (also referred to as a non-3GPP access network or a non-3GPP AN). The UE may be a terminal apparatus capable of performing radio communication such as a mobile phone or a smartphone, and may be a terminal apparatus capable of connecting to both the EPS and the 5GS. The UE may also include a Universal Integrated Circuit Card (UICC) and an embedded UICC (eUICC). Note that the UE may be expressed as a user equipment, or may be expressed as a terminal apparatus.

Furthermore, the access network_A corresponds to the Evolved Universal Terrestrial Radio Access Network (E-UTRAN) and/or a wireless LAN access network. In the E-UTRAN, one or more evolved Node Bs 45 (eNBs) are deployed. Note that in the following description, the eNB 45 is described, in some cases, as the eNB by omitting the reference numeral. Furthermore, in a case that there are multiple eNBs, the eNBs are connected to each other through, for example, an X2 interface. Furthermore, in the wireless LAN access network, one or more access points are deployed.

Furthermore, the access network_B corresponds to the 5G access network (5G AN). The 5G AN includes an NG Radio Access Network (NG-RAN) and/or a non-3GPP access network. In the NG-RAN, one or more gNBs (NR Node Bs) 122 are deployed. Note that in the following description, the gNB 122 is described, in some cases, as the eNB by omitting the reference numeral. The gNB is a node that provides the UE with a New Radio (NR) user plane and a control plane, and is a node that connects to the 5GCN via an NG interface (including an N2 interface or an N3 interface). That is, the gNB is a base station apparatus newly designed for the 5GS, and has a different function from that of the base station apparatus (eNB) having been used in the EPS, which is the 4G system. Furthermore, in a case that there are multiple gNBs, the gNBs are connected to each other through, for example, an Xn interface.

Furthermore, in the following description, the E-UTRAN and the NG-RAN are referred to as 3GPP access, in some cases. Furthermore, the wireless LAN access network and the non-3GPP AN are referred to as non-3GPP access, in some cases. Furthermore, nodes deployed in the access network_B are also collectively referred to as an NG-RAN node, in some cases.

Furthermore, in the following description, the access network_A and/or the access network_B and/or the apparatus included in the access network_A and/or the apparatus included in the access network_B is referred to as an access network or an access network apparatus, in some cases.

Furthermore, the core network_A corresponds to the Evolved Packet Core (EPC). In the EPC, for example, the Mobility Management Entity (MME), the Serving Gateway (SGW), the Packet Data Network Gateway (PGW)-U, the PGW-C, the Policy and Charging Rules Function (PCRF), the Home Subscriber Server (HSS), and the like are deployed.

Furthermore, the core network_B corresponds to the 5G Core Network (5GCN). In the 5GCN, for example, the Access and Mobility Management Function (AMF), the User Plane Function (UPF), the Session Management Function (SMF), the Policy Control Function (PCF), the Unified Data Management (UDM), and the like are deployed. Here, the 5GCN may be expressed as 5GC.

Furthermore, in the following description, the core network_A and/or the core network_B and/or the apparatus included in the core network_A and/or the apparatus included in the core network_B is referred to as a core network or a core network apparatus, in some cases.

The core network (core network_A and/or core network_B) may be an IP mobile communication network operated by a Mobile Network Operator (MNO) that has connected the access network (access network_A and/or access network_B) and the PDN and/or DN, may be a core network for a mobile network operator that operates and manages the mobile communication system 1, or may be a core network for a Mobile Virtual Network Operator (MVNO), a Mobile Virtual Network Enabler (MVNE), and the like.

Furthermore, FIG. 1 illustrates a case that the PDN and the DN are the same, but both of them may be different. The PDN may be a Data Network (DN) to provide a communication service to the UE. Note that the DN may be configured as a packet data service network, or configured for each service. Furthermore, the PDN may include a connected communication terminal. Accordingly, connecting with the PDN may be connecting with the communication terminal or a server device located in the PDN. Furthermore, the transmission and/or reception of the user data to and/or from the PDN may be transmission and/or reception of the user data to and/or from the communication terminal or the server device located in the PDN. Note that the PDN may be represented by the DN, or the DN may be represented by the PDN.

Furthermore, in the following description, at least some of the access network_A, the core network_A, the PDN, the access network_B, the core network_B, and the DN, and/or one or more apparatuses included therein are referred to as a network or a network apparatus, in some cases. That is, the expression "the network and/or the network apparatus transmits and/or receives a message and/or performs a procedure" signifies that "at least some of the access network_A, the core network_A, the PDN, the access network_B, the core network_B, and the DN and/or one or more apparatuses included therein transmit and/or receive a message and/or perform a procedure".

Moreover, the UE can connect to the access network. Furthermore, the UE can connect to the core network via the access network. Additionally, the UE can connect to the PDN or the DN via the access network and the core network. That is, the UE can transmit and/or receive (communicate) user data to and/or from (with) the PDN or the DN. In a case of transmitting and/or receiving the user data, not only Internet Protocol (IP) communication but also non-IP communication may be used.

Here, the IP communication is data communication using the IP, and data transmission and/or reception is performed by an IP packet. The IP packet includes an IP header and a payload portion. The payload portion may include data transmitted and/or received by apparatuses/functions included in the EPS or apparatuses/functions included in the 5GS. Furthermore, the non-IP communication is data communication without using the IP, and data transmission and/or reception is performed in a format different from the structure of the IP packet. For example, the non-IP communication may be the data communication achieved through transmitting and/or receiving application data not given the IP header, or may transmit and/or receive the user data transmitted and/or received by the UE to which another header such as an MAC header and an Ethernet (trade name) frame header is given.

2. Configuration of Each Apparatus

Next, the configuration of each apparatus (UE and/or access network apparatus and/or core network apparatus) used in each embodiment will be described with reference to the drawings. Note that each apparatus may be configured as physical hardware, may be configured as logical (virtual) hardware configured on general purpose hardware, or may be configured as software. Additionally, at least some (including all) of functions of each apparatus may be configured as physical hardware, logical hardware, or software.

Note that each storage unit (storage unit_A 340, storage unit_A 440, storage unit_B 540, storage unit_A 640, and storage unit_B 740) in each apparatus and function appearing in the following description includes, for example, a semiconductor memory, a Solid State Drive (SSD), a Hard Disk Drive (HDD), or the like. Furthermore, each storage unit can store not only information originally configured in the shipping stage but also various types of information transmitted and/or received to and/or from an apparatus/function (e.g., UE and/or access network apparatus and/or core network apparatus and/or PDN and/or DN) other than the apparatus/function itself. Furthermore, each storage unit can store identification information, control information, a flag, a parameter, and the like included in a control message which is transmitted and/or received in various communication procedures described below. Furthermore, each storage unit may store these pieces of information for each UE. Furthermore, in a case that interworking between the 5GS and the EPS is performed, each storage unit can store a control messages and user data transmitted and/or received to and/or from the apparatus/function included in the 5GS and/or the EPS. At this time, not only those transmitted and/or received via an N26 interface but also those transmitted and/or received without passing through the N26 interface can be stored.

2.1. Apparatus Configuration of UE

Figure 3:
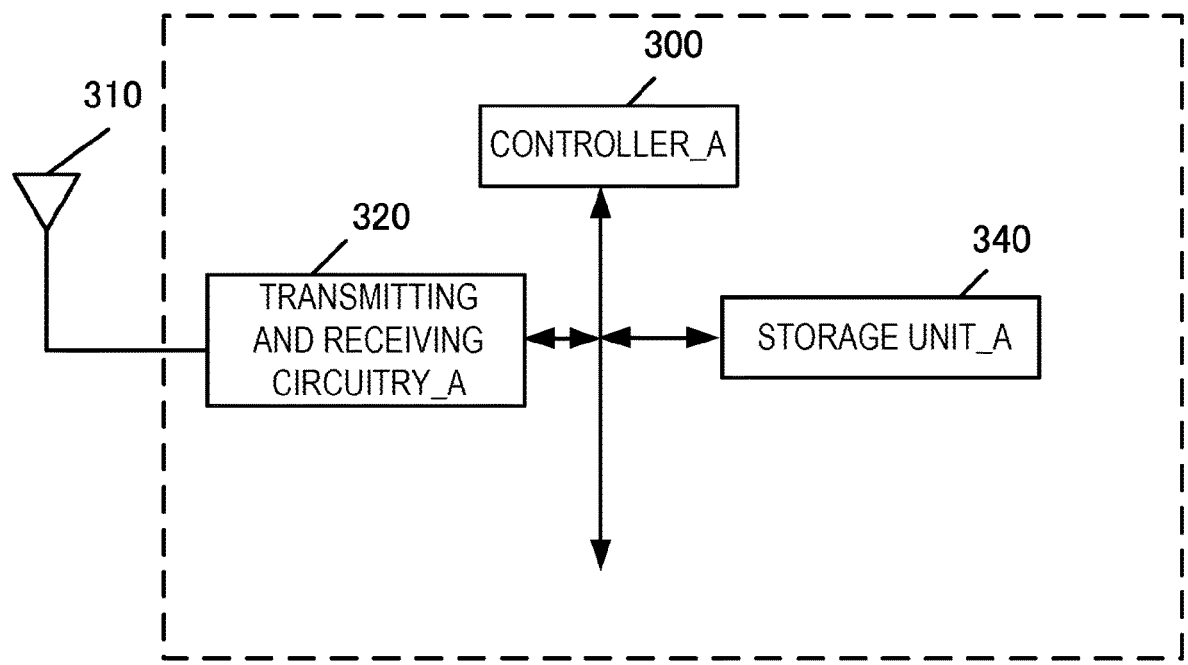
FIG. 3 is a diagram illustrating an apparatus configuration of a UE.

First, an apparatus configuration example of a User Equipment (UE) will be described using FIG. 3. The UE includes a controller_A 300, an antenna 310, a transmitting and receiving circuitry_A 320, and a storage unit_A 340. The controller_A 300, the transmitting and receiving circuitry_A 320, and the storage unit_A 340 are connected to each other via a bus. The transmitting and receiving circuitry_A 320 is connected to the antenna 310.

The controller_A 300 is a function unit that controls the operation and function of the UE as a whole. The controller_A 300 implements various types of processing in the UE by reading out various programs stored in the storage unit_A 340 and performing the programs as necessary.

The transmitting and receiving circuitry_A 320 is a function unit for performing radio communication with a base station apparatus (eNB or gNB) in the access network through the antenna. That is, the UE can transmit and/or receive user data and/or control information to and/or from the access network apparatus and/or the core network apparatus and/or the PDN and/or the DN, using the transmitting and receiving circuitry_A 320.

Explaining in detail with reference to FIG. 2, the UE can communicate with the base station apparatus (eNB) in the E-UTRAN via an LTE-Uu interface by using the transmitting and receiving circuitry_A 320. Furthermore, the UE can communicate with the base station apparatus (gNB) in the 5G AN by using the transmitting and receiving circuitry_A 320. Furthermore, the UE can transmit and/or receive to and/or from the AMF a Non-Access-Stratum (NAS) message via an N1 interface by using the transmitting and receiving circuitry_A 320. Note that since the N1 interface is logical, communication between the UE and the AMF is actually performed via the 5G AN.

The storage unit_A 340 is a function unit for storing programs, user data, control information, and the like necessary for each operation of the UE.

2.2. Apparatus Configuration of gNB

Figure 4:
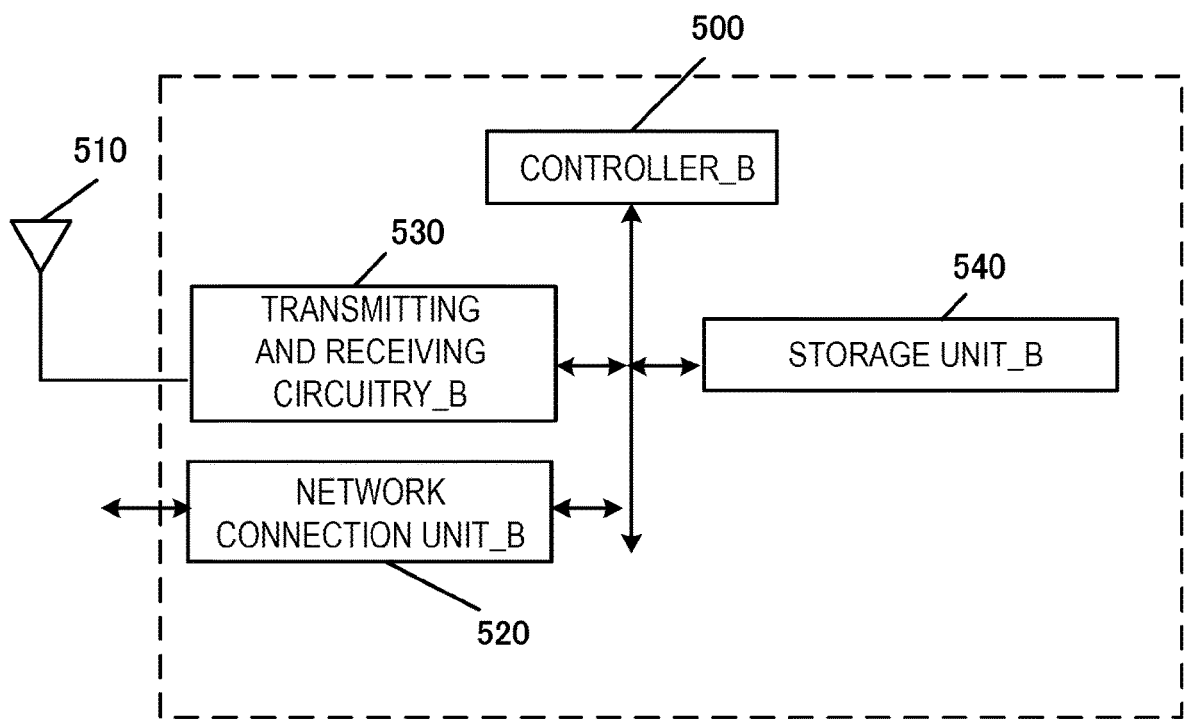
FIG. 4 is a diagram illustrating a configuration of an access network apparatus (gNB) in the 5GS.

Next, an apparatus configuration example of the gNB will be described using FIG. 4. The gNB includes a controller_B 500, an antenna 510, a network connection unit_B 520, a transmitting and receiving circuitry_B 530, and a storage unit_B 540. The controller_B 500, the network connection unit_B 520, the transmitting and receiving circuitry_B 530, and the storage unit_B 540 are connected to each other via a bus. The transmitting and receiving circuitry_B 530 is connected to the antenna 510.

The controller_B 500 is a function unit that controls the operation and function of the gNB as a whole. The controller_B 500 implements various types of processing in the gNB by reading out various programs stored in the storage unit_B 540 and performing the programs as necessary.

The network connection unit_B 520 is a function unit for the gNB to communicate with the AMF and/or the UPF. That is, the gNB can transmit and/or receive user data and/or control information to and/or from the AMF and/or the UPF by using the network connection unit_B 520.

The transmitting and receiving circuitry_B 530 is a function unit for performing radio communication with the UE through the antenna 510. That is, the gNB can transmit and/or receive user data and/or control information to and/or from the UE by using the transmitting and receiving circuitry_B 530.

Explaining in detail with reference to FIG. 2, by using the network connection unit_B 520, the gNB located in the 5G AN can communicate with the AMF via the N2 interface, and can communicate with the UPF via the N3 interface. Furthermore, the gNB can communicate with the UE by using the transmitting and receiving circuitry_B 530.

The storage unit_B 540 is a function unit for storing programs, user data, control information, and the like necessary for each operation of the gNB.

2.3. Apparatus Configuration of AMF

Figure 5:
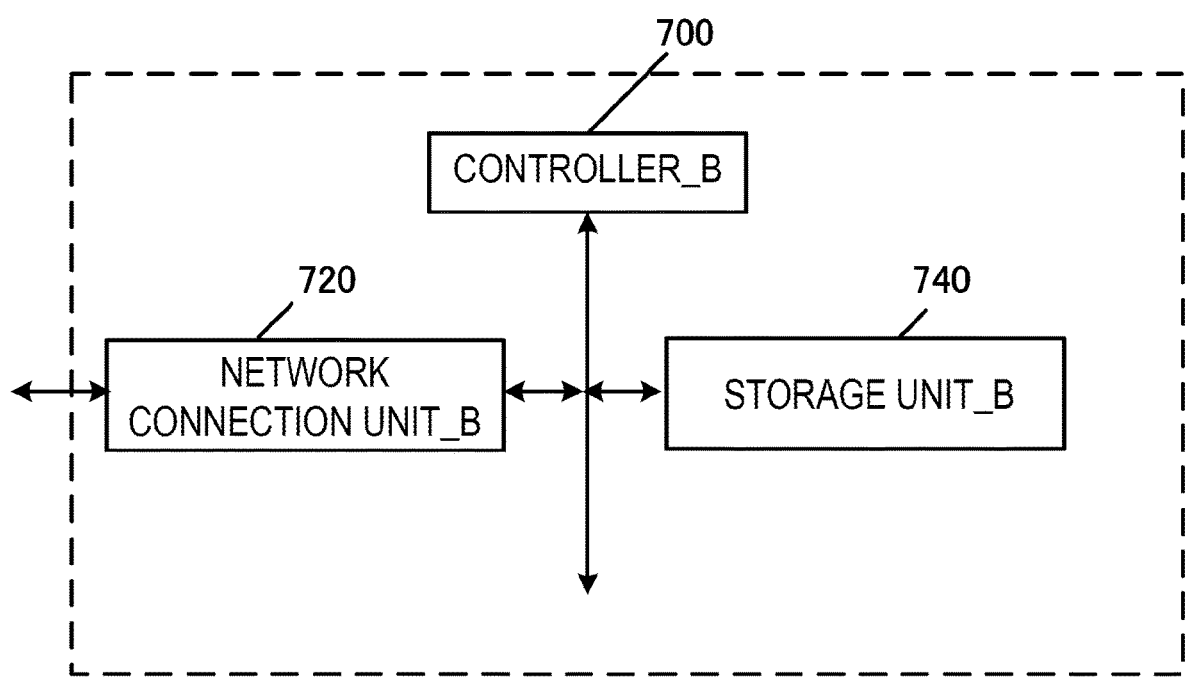
FIG. 5 is a diagram illustrating a configuration of a core network apparatus (AMF/SMF/UPF) in the 5GS.

Next, an apparatus configuration example of the AMF will be described using FIG. 5. The AMF includes a controller_B 700, a network connection unit_B 720, and a storage unit_B 740. The controller_B 700, the network connection unit_B 720, and the storage unit_B 740 are connected to each other via a bus. The AMF may be a node that handles the control plane.

The controller_B 700 is a function unit that controls the operation and function of the AMF as a whole. The controller_B 700 implements various types of processing in the AMF by reading out various programs stored in the storage unit_B 740 and performing the programs as necessary.

The network connection unit_B 720 is a function unit for the AMF to connect to the base station apparatus (gNB) in the 5G AN and/or the SMF and/or the PCF and/or the UDM and/or an SCEF. That is, the AMF can transmit and/or receive user data and/or control information to and/or from the base station apparatus (gNB) in the 5G AN and/or the SMF and/or the PCF and/or the UDM and/or the SCEF by using the network connection unit_B 720.

Explaining in detail with reference to FIG. 2, by using a network connection unit_A 620, the AMF located in the 5GCN can communicate with the gNB via the N2 interface, can communicate with the UDM via an N8 interface, can communicate with the SMF via an N11 interface, and can communicate with the PCF via an N15 interface. Furthermore, the AMF can transmit and/or receive to and/or from the UE the NAS message via the N1 interface by using the network connection unit_A 620. Note that since the N1 interface is logical, communication between the UE and the AMF is actually performed via the 5G AN. Furthermore, in a case of supporting the N26 interface, the AMF can communicate with the MME via the N26 interface by using the network connection unit_A 620.

The storage unit_B 740 is a function unit for storing programs, user data, control information, and the like necessary for each operation of the AMF.

Note that the AMF has a function of exchanging a control message with the RAN using the N2 interface, a function of exchanging a NAS message with the UE using the N1 interface, a function of performing encryption and integrity protection of the NAS message, a Registration management (RM) function, a Connection management (CM) function, a Reachability management function, a Mobility management function of the UE and the like, a function of transferring a Session Management (SM) message between the UE and the SMF, an Access Authentication (or Access Authorization) function, a Security Anchor Functionality (SEA), a Security Context Management (SCM) function, a function of supporting the N2 interface for a Non-3GPP Interworking Function (N3IWF), a function of supporting transmission and/or reception of a NAS signal to and/or from the UE via the N3IWF, a function of authenticating the UE to be connected via the N3IWF, and the like.

Furthermore, in the registration management, an RM state for each UE is managed. The RM state may be synchronized between the UE and the AMF. The RM state includes a deregistered state (RM-DEREGISTERED state) and a registered state (RM-REGISTERED state). In the RM-DEREGISTERED state, the UE is not registered in the network, and thus the AMF is in a state of not being able to reach the UE because the UE context in the AMF does not have valid location information and routing information for the UE. In the RM-REGISTERED state, the UE is registered in the network, and thus the UE can receive services that requires registration with the network. Note that the RM state may be expressed as a 5GMM state. In this case, the RM-DEREGISTERED state may be expressed as a 5GMM-DEREGISTERED state, and the RM-REGISTERED state may be expressed as a 5GMM-REGISTERED state.

In other words, 5GMM-REGISTERED may be a state in which each apparatus has established a 5GMM context, or a state in which each apparatus has established a PDU session context. Note that in a case that each apparatus is in 5GMM-REGISTERED, the UE_A 10 may initiate transmission and/or reception of user data or a control message, or may respond to paging. Furthermore, it should be noted that in the case that each apparatus is in 5GMM-REGISTERED, the UE_A 10 may perform a registration procedure other than the registration procedure for initial registration, and/or a service request procedure.

Furthermore, 5GMM-DEREGISTERED may be a state in which each apparatus has not established the 5GMM context, may be a state in which the location information of the UE_A 10 is not grasped by the network, or may be a state in which the network cannot reach the UE_A 10. Note that in a case that each apparatus is in 5GMM-DEREGISTERED, the UE_A 10 may initiate the registration procedure, or may establish the 5GMM context by performing the registration procedure.

Furthermore, in the connection management, a CM state for each UE is managed. The CM state may be synchronized between the UE and the AMF. The CM state includes a disconnected state (CM-IDLE state) and a connected state (CM-CONNECTED state). In the CM-IDLE state, the UE is in the RM-REGISTERED state but does not have a NAS signaling connection established between the AMF and the UE via the N1 interface. Also, in the CM-IDLE state, the UE does not have an N2 interface connection (N2 connection) and an N3 interface connection (N3 connection). On the other hand, in the CM-CONNECTED state, the UE has the NAS signaling connection established between the AMF and the UE via the N1 interface. Also, in the CM-CONNECTED state, the UE may have the N2 interface connection (N2 connection) and/or the N3 interface connection (N3 connection).

Furthermore, in the connection management, a CM state in the 3GPP access and a CM state in the non-3GPP access may be separately managed. In this case, the CM state in the 3GPP access may include a disconnected state in the 3GPP access (CM-IDLE state over 3GPP access) and a connected state in the 3GPP access (CM-CONNECTED state over 3GPP access). Furthermore, the CM state in the non-3GPP access may include a disconnected state in the non-3GPP access (CM-IDLE state over non-3GPP access) and a connected state in the non-3GPP access (CM-CONNECTED state over non-3GPP access). Note that the disconnected state may be expressed as an idle mode, and the connected state mode may be expressed as a connected mode.

Note that the CM state may be expressed as a 5GMM mode. In this case, the disconnected state may be expressed as a 5GMM disconnected mode (5GMM-IDLE mode), and the connected state may be expressed as a 5GMM connected mode (5GMM-CONNECTED mode). Furthermore, the disconnected state in the 3GPP access may be expressed as a 5GMM disconnected mode in the 3GPP access (5GMM-IDLE mode over 3GPP access), and the connected state in the 3GPP access may be expressed as a 5GMM connected mode in the 3GPP access (5GMM-CONNECTED mode over 3GPP access). Furthermore, the disconnected state in the non-3GPP access may be expressed as a 5GMM disconnected mode in the non-3GPP access (5GMM-IDLE mode over non-3GPP access), and the connected state in the non-3GPP access may be expressed as a 5GMM connected mode in the non-3GPP access (5GMM-CONNECTED mode over non-3GPP access). Note that the 5GMM disconnected mode may be expressed as an idle mode, and the 5GMM connected mode may be expressed as a connected mode.

In addition, one or more AMFs may be deployed within the core network_B. In addition, the AMF may be an NF that manages one or more Network Slice Instances (NSIs). In addition, the AMF may also be a Common Control Plane Network Function (Common CPNF, or CCNF) shared among multiple NSIs.

Note that the N3IWF is an apparatus and/or a function deployed between the non-3GPP access and the 5GCN in a case that the UE connects to the 5GS via the non-3GPP access.

2.4. Apparatus Configuration of SMF

Next, an apparatus configuration example of the SMF will be described using FIG. 5. The SMF includes the controller_B 700, the network connection unit_B 720, and the storage unit_B 740. The controller_B 700, the network connection unit_B 720, and the storage unit_B 740 are connected to each other via a bus. The SMF may be a node that handles the control plane.

The controller_B 700 is a function unit that controls the operation and function of the SMF as a whole. The controller_B 700 implements various types of processing in the SMF by reading out various programs stored in the storage unit_B 740 and performing the programs as necessary.

The network connection unit_B 720 is a function unit for the SMF to connect to the AMF and/or the UPF and/or the PCF and/or the UDM. That is, the SMF can transmit and/or receive user data and/or control information to and/or from the AMF and/or the UPF and/or the PCF and/or the UDM by using the network connection unit_B 720.

Explaining in detail with reference to FIG. 2, by using the network connection unit_A 620, the SMF located in the 5GCN can communicate with the AMF via the N11 interface, can communicate with the UPF via an N4 interface, can communicate with the PCF via an N7 interface, and can communicate with the UDM via an N10 interface.

The storage unit_B 740 is a function unit for storing programs, user data, control information, and the like necessary for each operation of the SMF.

The SMF has a Session Management function such as establishment, modification, and release of a PDU session, an IP address allocation and management function for the UE, a UPF selection and control function, a UPF configuration function for routing traffic to an appropriate destination (transmission destination), a function of transmitting and/or receiving an SM portion of a NAS message, a function of reporting arrival of downlink data (Downlink Data Notification), a function of providing SM information unique to the AN (for each AN) to be transmitted to the AN via the AMF through the N2 interface, a function of determining a Session and Service Continuity mode (SSC mode) for a session, a roaming function, and the like.

2.5. Apparatus Configuration of UPF

Next, an apparatus configuration example of the UPF will be described using FIG. 5. The UPF includes the controller_B 700, the network connection unit_B 720, and the storage unit_B 740. The controller_B 700, the network connection unit_B 720, and the storage unit_B 740 are connected to each other via a bus. The UPF may be a node that handles the control plane.

The controller_B 700 is a function unit that controls the operation and function of the UPF as a whole. The controller_B 700 implements various types of processing in the UPF by reading out various programs stored in the storage unit_B 740 and performing the programs as necessary.

The network connection unit_B 720 is a function unit for the UPF to connect to the base station apparatus (gNB) in the 5G AN and/or the SMF and/or the DN. That is, the UPF can transmit and/or receive user data and/or control information to and/or from the base station apparatus (gNB) in the 5G AN and/or the SMF and/or the DN by using the network connection unit_B 720.

Explaining in detail with reference to FIG. 2, by using the network connection unit_A 620, the UPF located in the 5GCN can communicate with the gNB via the N3 interface, can communicate with the SMF via the N4 interface, can communicate with the DN via an N6 interface, and can communicate with another UPF via an N9 interface.

The storage unit_B 740 is a function unit for storing programs, user data, control information, and the like necessary for each operation of the UPF.

The UPF has a function as an anchor point for intra-RAT mobility or inter-RAT mobility, a function as an external PDU session point for interconnection with the DN (that is, a function of transferring user data as a gateway between the DN and the core network_B), a function of routing and transferring of a packet, an Uplink Classifier (UL CL) function of supporting routing of multiple traffic flows for one DN, a Branching point function of supporting a multi-homed PDU session, a Quality of Service (QoS) processing function for a user plane, a verification function of uplink traffic, a function of triggering downlink packet buffering and Downlink Data Notification, and the like.

Furthermore, the UPF may serve as a gateway for IP communication and/or non-IP communication. Furthermore, the UPF may have a function of transferring IP communication or a function to perform conversion between non-IP communication and IP communication. The multiple gateways deployed may further serve as gateways for connecting the core network_B with a single DN. Note that the UPF may have connectivity with another NF or may be connected to each apparatus via another NF.

Note that a user plane is user data transmitted and/or received between the UE and the network. The user plane may be transmitted and/or received using PDN connection or a PDU session. Furthermore, in a case of the EPS, the user plane may be transmitted and/or received using the LTE-Uu interface and/or an S1-U interface and/or an S5 interface and/or an S8 interface and/or an SGi interface. Furthermore, in a case of the 5GS, the user plane may be transmitted and/or received via the interface between the UE and the NG RAN and/or the N3 interface and/or the N9 interface and/or the N6 interface. In the following description, the user plane may be expressed as U-Plane.

Furthermore, a control plane is a control message transmitted and/or received for performing communication control and the like of the UE. The control plane may be transmitted and/or received using Non-Access-Stratum (NAS) signalling connection between the UE and the MME. Furthermore, in the case of the EPS, the control plane may be transmitted and/or received using the LTE-Uu interface and an S1-MME interface. Furthermore, in the case of the 5GS, the control plane may be transmitted and/or received using the interface between the UE and the NG RAN and the N2 interface. In the following description, the control plane may be expressed as a control plane, or may be expressed as C-Plane.

Furthermore, a User Plane (U-Plane or UP) may be a communication path for transmitting and/or receiving user data, and may include multiple bearers. Furthermore, a Control Plane (C-Plane or CP) may be a communication path for transmitting and/or receiving a control message, and may include multiple bearers.

2.6. Description of Other Apparatuses and/or Functions

Next, other apparatuses and/or functions will be described.

The PCF has a function of providing a policy rule, and the like.

Furthermore, the UDM has an authentication information processing (Authentication credential processing) function, a user identification processing function, an access authentication function, a registration/mobility management function, a subscriber information management (subscription management) function, and the like.

Furthermore, the PCRF is connected to the PGW and/or the PDN, and has a function of performing QoS management for data delivery, and the like. For example, the PCRF manages QoS of a communication path between the UE_A 10 and the PDN. Furthermore, the PCRF may be an apparatus to create and/or manage a Policy and Charging Control (PCC) rule and/or a routing rule used by each apparatus for transmitting and/or receiving user data.

Furthermore, the HSS is connected to the MME and/or the SCEF, and has a function of managing subscriber information, and the like. The subscriber information in the HSS is referenced during access control of the MME, for example. Moreover, the HSS may be connected to a location management device different from the MME.

Furthermore, the SCEF is connected to the DN and/or the PDN, the MME, and the HSS, and has a function as a relay device that transfers the user data as a gateway that connects the DN and/or the PDN with the core network_A, and the like. Note that the SCEF may serve as a gateway for non-IP communication. Furthermore, the SCEF may have a function to perform conversion between non-IP communication and IP communication. Multiple gateways like this may be deployed in the core network_A. The SCEF may be configured outside or inside the core network.

3. Description of Terms and Identification Information, and Procedure Used in Each Embodiment Terms and identification Information, and procedures at least one of which is used in each embodiment will be described beforehand.

3.1. Description of Terms and Identification Information Used in Each Embodiment First, highly specialized terms used in each embodiment and identification information used in a procedure will be described beforehand.

The network refers to at least some of the access network_B, the core network_B, and the DN. One or more apparatuses included in at least some of the access network_B, the core network_B, and the DN may also be referred to as a network or a network apparatus. Specifically, the expression "the network performs transmission and/or reception of a message and/or processing" may signify that "an apparatus (network apparatus and/or control device) in the network performs transmission and/or reception of a message and/or processing". In contrast, the expression "an apparatus in the network performs transmission and/or reception of a message and/or processing" may signify that "the network performs transmission and/or reception of a message and/or processing".

Furthermore, a session management (SM) message (also referred to as a Non-Access-Stratum (NAS) SM message) may be a NAS message used in a procedure for the SM, or may be a control message transmitted and/or received between the UE_A 10 and an SMF_A 230 via an AMF_A 240. In addition, the SM message may include a PDU session establishment request message, a PDU session establishment accept message, a PDU session complete message, a PDU session reject message, a PDU session modification request message, a PDU session modification accept message, a PDU session modification response message, and the like. Moreover, the procedure for the SM may include a PDU session establishment procedure.

Furthermore, a 5G System (5GS) service may be a connection service provided using the core network_B 190. In addition, the 5GS service may be a service different from the EPS service, or a service the same as the EPS service.

Furthermore, a non 5GS service may be a service other than the 5GS service, and may include the EPS service and/or a non EPS service.

Furthermore, a single registration mode is a mode in which the UE_A 10 maintains a common registered state for the 5GMM state and an EMM state in a case that an N1 mode and an S1 mode are available.

Furthermore, a dual registration mode is a mode in which the UE_A 10 independently maintains registered states of the 5GMM state and the EMM state in the case that the N1 mode and the S1 mode are available. Note that, in the case of dual registration mode, the UE_A 10 may be registered in the network only with the N1 mode (i.e., registered only in the 5GC), may be registered in the network only with the S1 mode (registered only in the EPC), or may be registered in the network with both the N1 mode and the S1 mode (registered in both the 5GC and EPC).

Furthermore, in order to perform interworking of the 5GS and the EPC, the UE that supports both the 5GC and the EPC NAS can operate in the single registration mode or the dual registration mode.

Furthermore, the S1 mode is a mode in which the UE_A 10 is allowed to access the EPC via the E-UTRAN. In other words, the S1 mode may be a mode in which transmission and/or reception of a message using an S1 interface is performed. Note that the S1 interface may include the S1-MME interface and the S1-U interface.

Furthermore, the N1 mode is a mode in which the UE_A 10 is allowed to access the 5GC via the 5G access network.

In other words, the N1 mode may be a mode in which transmission and/or reception of a message using the N1 interface is performed.

Furthermore, an Access Point Name (APN) may be identification information for identifying the core network and/or an external network such as the PDN. In addition, the APN can also be used as information for selecting a gateway such as a PGW_A 30/UPF_A 235 for connecting the core network A_90.

Furthermore, a Packet Data Network (PDN) type indicates the type of PDN connection, and includes IPv4, IPv6, IPv4v6, and non-IP. A case that the IPv4 is specified indicates that data are transmitted and/or received by using the IPv4. A case that the IPv6 is specified indicates that data are transmitted and/or received by using the IPv6. A case that the IPv4v6 is specified indicates that data are transmitted and/or received by using the IPv4 or the IPv6. A case that the non-IP is specified indicates that communication is performed by a communication method other than the IP instead of communication using the IP.

Furthermore, the Protocol Data Unit/Packet Data Unit (PDU) session can be defined as a relationship between the DN which provides PDU connectivity service and the UE, but may be connectivity established between the UE and an external gateway. The UE can, in the 5GS, by establishing a PDU session via the access network_B and the core network_B, transmit and/or receive user data to and/or from the DN using the PDU session. Here, the external gateway may be the UPF, the SCEF, or the like. The UE can perform transmission and/or reception of user data to and/or from an apparatus, such as an application server, deployed in the DN, using the PDU session.

Note that each apparatus (UE and/or access network apparatus and/or core network apparatus) may correlate one or more pieces of identification information to the PDU session for management. Note that these pieces of identification information may include one or more of a DNN, a QoS rule, the PDU session type, application identification information, NSI identification information, access network identification information, and the SSC mode, or may further include other information. Furthermore, in a case that multiple PDU sessions are established, respective pieces of identification information correlated to the PDU sessions may be the same contents or may be different contents.

Furthermore, the Data Network Name (DNN) may be identification information for identifying the core network and/or an external network such as the DN. Furthermore, the DNN can also be used as information for selecting the gateway such as the PGW_A 30/UPF_A 235 for connecting the core network B190. In addition, the DNN may correspond to the Access Point Name (APN).

Furthermore, the Protocol Data Unit/Packet Data Unit (PDU) session type indicates the type of a PDU session, and includes the IPv4, the IPv6, the Ethernet, and Unstructured. A case that the IPv4 is specified indicates that data are transmitted and/or received by using the IPv4. A case that the IPv6 is specified indicates that data are transmitted and/or received by using the IPv6. A case that the Ethernet is specified indicates that an Ethernet frame is transmitted and/or received. In addition, the Ethernet may indicate that communication using the IP is not performed. A case that the Unstructured is specified indicates that data are transmitted and/or received to and/or from an application server or the like in the DN using a Point-to-Point (P2P) tunneling technique. As the P2P tunneling technique, for example, a UDP/IP encapsulation technique may be used. Note that the PDU session type may include the IP in addition to those described above. The IP can be specified in a case that the UE is capable of using both the IPv4 and the IPv6.

Furthermore, a Network Slice (NS) is a logical network that provides a specific network capability and network performance. The UE and/or the network can support the network slice (NW slices; NS) at the 5GS.

Moreover, a network slice instance (NSI) includes an instance (entity) of the network function (NF) and a set of required resources, and forms a deployed network slice. Here, the NF is a processing function in the network and is employed or defined in the 3GPP. The NSI is an entity of one or more NSs configured in the core network_B. The NSI may include a virtual Network Function (NF) generated using a Network Slice Template (NST). Here, the NST is associated with a resource request for providing a required communication service or capability, and is a logical expression of one or more NFs. Specifically, the NSI may be an aggregation including multiple NFs in the core network_B 190. The NSI may be a logical network configured to classify the user data delivered through a service or the like. The NS may include one or more NFs. The NF included in the NS may be an apparatus shared by another NS or otherwise. The UE and/or the apparatus in the network can be assigned to one or more NSs based on registration information such as NSSAI and/or S-NSSAI and/or a UE usage type and/or one or more NSI IDs, and/or the APN. Note that the UE usage type is a parameter value which is used for identifying the NSI and included in the registration information of the UE. The UE usage type may be stored by the HSS. The AMF may select the SMF and the UPF, based on the UE usage type.

Furthermore, the Single Network Slice Selection Assistance Information (S-NSSAI) is information for identifying the NS. The S-NSSAI may include only a Slice/Service type (SST), or may include both the SST and a Slice Differentiator (SD). Here, the SST is information indicating the operation of an NS expected in terms of a function and service. Additionally, in a case of selecting one NSI from multiple NSIs indicated by the SST, the SD may be information that interpolates the SST. The S-NSSAI may be information unique to each PLMN, or may be standard information common between PLMNs. Furthermore, the network may store one or more pieces of S-NSSAI in the registration information of the UE as default S-NSSAI. Note that in a case that the S-NSSAI is the default S-NSSAI, in a case that the UE does not transmit valid S-NSSAI to the network in the registration request message, the network may provide an NS related to the UE.

Furthermore, the Network Slice Selection Assistance Information (NSSAI) is a group of pieces of S-NSSAI. Each S-NSSAI included in the NSSAI is information that assists the access network or the core network to select the NSI. The UE may store the NSSAI allowed from the network for each PLMN. Furthermore, the NSSAI may also be information used to select the AMF.

Furthermore, the Session and Service Continuity (SSC) mode indicates a mode of Session and Service Continuity supported by a system and/or each apparatus in the 5G system (5GS). To be more specific, the SSC mode may be a mode indicating a type of the session and service continuity supported by a PDU session established between the UE_A 10 and the UPF. Note that the SSC mode may be a mode indicating a type of the session and service continuity configured for each PDU session. The SSC mode may be configured to include three modes of SSC mode 1, SSC mode 2, and SSC mode 3. Note that the SSC mode correlated to the PDU session may not be changed while the PDU session exists.

In addition, a 5GMM-CONNECTED mode with RRC inactive indication is a state indicating that the state of the NAS layer is a connected state despite that the RRC layer is in an inactive state. In other words, the 5GMM-CONNECTED mode with RRC inactive indication is a state in which a radio bearer is released while maintaining NAS signalling connection and/or a context of NAS signalling connection.

Note that support of the 5GMM-CONNECTED mode with RRC inactive indication may mean that, even in a case of receiving a notification indicating that the RRC layer has become inactive from the lower layer, maintaining the state of the NAS layer in the connected state is supported. Furthermore, use of the 5GMM-CONNECTED mode with RRC inactive indication may mean that, even in the case of receiving a notification indicating that the RRC layer has become inactive from the lower layer, the state of the NAS layer is maintained in the connected state.

A tracking area is one or multiple ranges which the core network manages and which can be represented by the location information of the UE_A 10. The tracking area may include multiple cells. Furthermore, the tracking area may be a range in which a control message such as paging is broadcast, or a range in which the UE_A 10 can move without a handover procedure. Furthermore, the tracking area may be a routing area, a location area, or those similar to them. The tracking area hereinafter may be Tracking Area (TA).

A TA list is a list including one or multiple TAs assigned to the UE_A 10 by the network. Note that while the UE_A 10 is moving within one or multiple TAs included in the TA list, the UE_A 10 may be able to move without performing a tracking area update procedure. In other words, for the UE_A 10, the TA list may be an information group indicating an area in which the UE_A 10 can move without performing the tracking area update procedure. Note that the TA list may be expressed as a TAI list including one or multiple Tracking area identities (TAIs), and in the following description, the TAI list may indicate the TA list.

A Local Area Data Network (LADN) is a DN to which the UE is connectable only at a specific location, and provides connectivity to a specific DNN (that is, LADN DNN). The LADN may be a connectable DN, at a specific location, by using a PDU session correlated to the specific DNN. Furthermore, the LADN may be a connectable DN, at a specific location, by using a PDU session correlated to a combination of a specific DNN and specific S-NSSAI.

LADN information is information related to the LADN. The LADN information may be information indicating a specific LADN available to the UE. The LADN information may include the LADN DNN and LADN service area information. More specifically, the LADN information may include one or multiple pieces of information present for each LADN (hereinafter, referred to as information indicating the LADN). Furthermore, the information indicating the LADN may include the LADN DNN and LADN service area information. Here, the LADN DNN may be information for identifying the LADN, may be information for identifying the DN handled as the LADN, or may be the DNN used in establishing a PDU session for the LADN.

Note that in a case that the LADN information is the existing LADN information, the LADN information may be information of the configuration described above. Specifically, in the case that the LADN information is the existing LADN information, a LADN service area may be the existing LADN service area.

In contrast, in a case that the LADN information is expanded LADN information, the LADN information may be information in which part of the configuration described above is expanded. Specifically, in the case that the LADN information is the expanded LADN information, the LADN service area may be an expanded LADN service area. Furthermore, in the case that the LADN information is the expanded LADN information, the information indicating the LADN may further include information indicating a period in which the LADN service area is valid, and/or information indicating the granularity of the LADN service area. Furthermore, in the case that the LADN information is the expanded LADN information, the information indicating the LADN may further include the S-NSSAI.

The LADN service area is an area where a PDU session for the LADN can be established. The LADN service area may be an area where connection to the LADN can be performed. Furthermore, the LADN service area may be an area indicated by the LADN service area information. Here, the LADN service area information may be information for identifying the LADN service area, may be provided as a set of tracking areas, or may be provided as a Tracking area identity (TAI) list.

Note that in a case that the LADN service area is the existing LADN service area, the LADN service area may be an area including a tracking area belonging to a registration area to which the UE is currently connected. In other words, in the case that the LADN service area is the existing LADN service area, the LADN service area may be an area including one or multiple tracking areas. In contrast, in a case that the LADN service area is an expanded LADN service area, the LADN service area may be an area including the tracking area, or may be an area covered by some base stations in the tracking area. Furthermore, in the case that the LADN service area is the expanded LADN service area, the LADN service area may be an area having a size other than that of an area including the tracking area, or may be an area not depending on the tracking area. In other words, in the case that the LADN service area is the expanded LADN service area, the LADN service area may be an area including one or multiple tracking areas, or may be an area different from the area including one or multiple tracking areas.

Furthermore, in a case that the LADN service area is the area including one or multiple tracking areas, the LADN service area information may be a tracking area ID list including one or multiple tracking area IDs. In contrast, in a case that the LADN service area is an area different from the area including one or multiple tracking areas, the LADN service area information may be information requiring assistance of the Radio Access Network (RAN), or may be information not requiring assistance of the RAN. Here, the information requiring assistance of the RAN may be information of a cell, or may be information of the base station. Furthermore, the information requiring assistance of the RAN may be a cell ID, or may be a base station ID. Furthermore, the information requiring assistance of the RAN is not limited to those described above, and may be information defined by the RAN. Furthermore, the information not requiring assistance of the RAN may be physical location information, or may be location information obtainable by the application. Furthermore, the information not requiring assistance of the RAN is not limited to those described above, and may be information obtainable by other than the RAN. Here, the RAN may be expressed as an access network. In contrast, the access network may be expressed as the RAN.

Expansion of the LADN service area may mean using a LADN service area of granularity different from that of the existing LADN service area. Furthermore, expansion of the LADN service area may mean using expanded LADN information different from the existing LADN information. Furthermore, expansion of the LADN service area may mean connecting to expanded LADN different from the existing LADN.

That is, in a case that each apparatus supports expansion of the LADN service area, in addition to the existing LADN service area, the expanded LADN service area different from the existing LADN service area may also be adaptable. In addition, in the case that each apparatus supports expansion of the LADN service area, in addition to the existing LADN information, the expanded LADN information different from the existing LADN information may also be available. Furthermore, in the case that each apparatus supports expansion of the LADN service area, in addition to the existing LADN, connection to the expanded LADN different from the existing LADN may be able to be performed.

In contrast, in a case that some of the apparatuses do not support expansion of the LADN service area, the expanded LADN service area may not be adaptable, and only the existing LADN service area may be adaptable. In addition, in the case that some of the apparatuses do not support expansion of the LADN service area, the expanded LADN information may not be available, and only the existing LADN information may be available. Furthermore, in the case that some of the apparatuses do not support expansion of the LADN service area, connection to the expanded LADN may not be able to be performed, and only connection to the existing LADN may be able to be performed.

Furthermore, in a case that each apparatus supports a use restriction of expansion of the LADN service area, the expanded LADN service area may not be adaptable, and only the existing LADN service area may be adaptable. Furthermore, in the case that each apparatus supports the use restriction of expansion of the LADN service area, the expanded LADN information may not be available, and only the existing LADN information may be available. Furthermore, in the case that each apparatus supports the use restriction of expansion of the LADN service area, connection to the expanded LADN may not be able to be performed, and only connection to the existing LADN may be able to be performed.

In contrast, in a case that each apparatus does not support a use restriction of expansion of the LADN service area, the expanded LADN service area may also be adaptable. In addition, in the case that each apparatus does not support the use restriction of expansion of the LADN service area, the expanded LADN information may also be available. Furthermore, in the case that each apparatus does not support the use restriction of expansion of the LADN service area, connection to the expanded LADN may be able to be performed.

A PDU session for LADN is a PDU session correlated to a DNN associated with the LADN. The PDU session for LADN may be a PDU session established for the LADN. In other words, it may be a PDU session established between the UE and the LADN, or a PDU session used for user data communication between the UE and the LADN. Note that the PDU session for LADN may be a PDU session which can be established only in the LADN service area. In other words, the UE may be capable of establishing a PDU session for LADN, at a specific location, by using a specific DNN. Furthermore, in other words, the UE may be capable of establishing a PDU session for LADN, at a specific location, by using a combination of a specific DNN and specific S-NSSAI.

First identification information is information indicating whether or not the UE supports expansion of the LADN service area. The first identification information may be a bit indicating that expansion of the LADN service area is supported, or a bit indicating that expansion of the LADN service area is not supported.

Furthermore, the first identification information may be information indicating whether or not the UE supports a use restriction of expansion of the LADN service area. Furthermore, the first identification information may be a bit indicating that the use restriction of expansion of the LADN service area is supported, or a bit indicating that the use restriction of expansion of the LADN service area is not supported.

Furthermore, the first identification information may be a bit constituting a 5GMM capability information element indicating the capability of the UE at the 5G. Furthermore, the first identification information may be information selected and determined based on UE capability information and/or a UE configuration and/or a UE state and/or a user policy and/or an application request.

Second identification information is a LADN indication. The second identification information is information indicating a request for LADN information. The second identification information may be information indicating whether or not to request the LADN information. Furthermore, the second identification information may be information indicating a LADN DNN to be requested. Furthermore, the second identification information may be information indicating a LADN serving area to be requested.

Furthermore, the second identification information may be information indicating a request for updating the LADN information, or may be information indicating the updated LADN information. Furthermore, the second identification information is information indicating a request for deletion of the LADN information.

Furthermore, the second identification information may be an information element including a LADN indication. Furthermore, the information element including the LADN indication may be a LADN indication information element. Note that the LADN indication information element may include one or multiple LADN DNNs. Conversely, the LADN indication information element may be an information element not including the LADN DNN. In other words, the LADN indication information element may be an information element not including a specific LADN DNN.

Furthermore, the second identification information may be a bit constituting a 5GMM capability information element indicating the capability of the UE at the 5G. Furthermore, the second identification information may be information selected and determined based on UE capability information and/or a UE configuration and/or a UE state and/or a user policy and/or an application request.

11th identification information is information indicating whether or not the network supports expansion of the LADN service area. The 11th identification information may be a bit indicating that expansion of the LADN service area is supported, or a bit indicating that expansion of the LADN service area is not supported.

Furthermore, the 11th identification information may be information indicating whether or not the network supports a use restriction of expansion of the LADN service area.

Furthermore, the 11th identification information may be a bit indicating that the use restriction of expansion of the LADN service area is supported, or a bit indicating that the use restriction of expansion of the LADN service area is not supported.

Furthermore, the 11th identification information may be a bit constituting a 5GS network feature support information element indicating the capability of the network at the 5G. Furthermore, the 11th identification information may be information selected and determined, by the network, based on the received first identification information and/or information correlated to the DN and/or information correlated to the NSI and/or network capability information and/or an operator policy and/or a network state and/or user registration information and/or the like. Furthermore, the 11th identification information may be information selected and determined based on another identification information which has been selected by the network in the present procedure.

12th identification information is LADN information. The 12th identification information may be LADN information allowed by the network, or may be valid LADN information. Furthermore, the 12th identification information may be information transmitted and/or received in the case that the LADN service area is present in a registration area to which the UE is connected.

Furthermore, in a case that the first identification information and/or the 11th identification information is information indicating that expansion of the LADN service area is supported, the 12th identification information may be expanded LADN information different from the existing LADN information. In contrast, in a case that the first identification information and/or the 11th identification information is information indicating that expansion of the LADN service area is not supported, the 12th identification information may be the existing LADN information.

In addition, in a case that the first identification information and/or the 11th identification information is information indicating that a use restriction of expansion of the LADN service area is supported, the 12th identification information may be the existing LADN information. In contrast, in a case that the first identification information and/or the 11th identification information is information indicating that a use restriction of expansion of the LADN service area is not supported, the 12th identification information may be expanded LADN information different from the existing LADN information.

Furthermore, the 12th identification information may be information selected and determined, by the network, based on the received identification information and/or information correlated to the DN and/or information correlated to the NSI and/or network capability information and/or an operator policy and/or a network state and/or user registration information and/or the like. Furthermore, the 12th identification information may be information selected and determined based on another identification information which has been selected by the network in the present procedure.

Furthermore, the 12th identification information may be an information element including LADN information. Furthermore, the information element including the LADN information may be a LADN information information element. Note that the LADN information information element may include one or multiple LADN DNNs. In contrast, the LADN information information element may be an information element not including the LADN DNN. In other words, the LADN information information element may be an information element not including a specific LADN DNN.

13th identification information is information indicating the granularity of the LADN service area. The 13th identification information may be information indicating the size of the LADN service area. Furthermore, the 13th identification information may be transmitted and/or received in correlation with the 12th identification information, or may be transmitted and/or received in correlation with information (hereinafter, referred to as information indicating the LADN) present for each LADN included in the 12th identification information. Furthermore, the 13th identification information may be transmitted and/or received for each information indicating the LADN. In this case, the 13th identification information may be different for each information indicating the LADN, or may be the same among multiple pieces of information indicating the LADN.

Note that in a case that the 13th identification information is transmitted and/or received in correlation with the information indicating the LADN, the 13th identification information may be information indicating the granularity of the LADN service area information included in the information indicating the LADN (hereinafter, referred to as LADN service area information).

For example, the 13th identification information may be information indicating that an area including one or multiple tracking areas is used as the LADN service area. In this case, to the LADN service area information, a tracking area ID list including one or multiple tracking area IDs may be configured.

Furthermore, the 13th identification information may be information indicating that an area different from the area including one or multiple tracking areas is used as the LADN service area. In this case, to the LADN service area information, information requiring assistance of the RAN may be configured, or information not requiring assistance of the RAN may be configured.

Furthermore, the 13th identification information may be information indicating that an area covered by some base stations in the tracking area is used as the LADN service area. In this case, to the LADN service area information, a cell ID and/or a cell ID list including one or multiple cell IDs may be configured.

Furthermore, the 13th identification information may be information indicating that an area configured without depending on the tracking area is used as the LADN service area. In this case, to the LADN service area information, physical location information may be configured.

Here, in a case that the 13th identification information is not transmitted and/or received, and/or the 13th identification information is invalid information, an area including one or multiple tracking areas may be used as the LADN service area. Furthermore, to the LADN service area information, a tracking area ID list including one or multiple tracking area IDs may be configured. Note that the granularity indicated by the 13th identification information and/or the LADN service area information may not be limited to those described above.

Furthermore, the 13th identification information may be information selected and determined, by the network, based on the received first identification information and/or information correlated to the DN and/or information correlated to the NSI and/or network capability information and/or an operator policy and/or a network state and/or user registration information and/or the like. Furthermore, the 13th identification information may be information selected and determined based on another identification information which has been selected by the network in the present procedure.

14th identification information is information indicating a period in which the LADN service area is valid. The 14th identification information may be information indicating whether or not the LADN service area is currently valid. Furthermore, the 14th identification information may be transmitted and/or received in correlation with the 12th identification information, or may be transmitted and/or received in correlation with information (hereinafter, referred to as information indicating the LADN) present for each LADN included in the 12th identification information. Furthermore, the 14th identification information may be transmitted and/or received for each information indicating the LADN. In this case, the 14th identification information may be different for each information indicating the LADN, or may be the same among multiple pieces of information indicating the LADN.

Here, the information indicating a period in which the LADN service area is valid may be information indicating time in which the LADN service area is valid, or may be information indicating a period indicated by a concrete date and time. Furthermore, the information indicating the period in which the LADN service area is valid may be information indicating a specific time period, or may be information indicating a specific day of the week. Furthermore, the information indicating the period in which the LADN service area is valid may be information indicating a specific day, or may be information indicating a specific week. Furthermore, the information indicating the period in which the LADN service area is valid may be information indicating a specific month, or may be information indicating a specific year.

Here, in a case that the 14th identification information is not transmitted and/or received, and/or the 14th identification information is invalid information, the period in which the LADN service area is valid may be a period until the LADN information and/or the information indicating the LADN is updated. Note that the information indicating the period in which the LADN service area is valid may not be limited to those described above.

Furthermore, the 14th identification information may be information selected and determined, by the network, based on the received first identification information and/or information correlated to the DN and/or information correlated to the NSI and/or network capability information and/or an operator policy and/or a network state and/or user registration information and/or the like. Furthermore, the 14th identification information may be information selected and determined based on another identification information which has been selected by the network in the present procedure.

15th identification information is a LADN failure indication. The 15th identification information may be information indicating that a request for LADN information for the LADN DNN included in the LADN indication information element has failed. In other words, the 15th identification information may be information indicating that a request for LADN information for the one or multiple LADN DNNs among the LADN DNNs included in the second identification information has failed.

Furthermore, the 15th identification information may be information indicating the LADN DNN for which a request for the LADN information has been failed. In other words, the 15th identification information may be information indicating the LADN DNN, for which a request for LADN information has failed, among the LADN DNNs included in the 12th identification information.

Furthermore, the 15th identification information may be information including one or multiple LADN DNNs.

Furthermore, the 15th identification information may be an information element including the LADN failure indication. Furthermore, the information element including the LADN failure indication may be a LADN failure indication information element. Note that the LADN failure indication information element may include one or multiple LADN DNNs.

Furthermore, the 15th identification information may be information selected and determined, by the network, based on the received second identification information and a DNN list held by the network. Here, the DNN list held by the network may be a list of DNNs correlated to subscriber information of the UE.

Specifically, in a case that one or multiple LADN DNNs among the LADN DNNs included in the second identification information do not match with any of the DNNs included in the DNN list held by the network, the network may include the LADN DNNs in the 15th identification information. In other words, in a case that one or multiple LADN DNNs which are included in the second identification information and do not match with any of DNNs included in the DNN list held by the network are present, the network may include the LADN DNNs in the 15th identification information.

Furthermore, the 15th identification information may be information selected and determined, by the network, based on the received second identification information and a LADN DNN configured to the network.

Specifically, in a case that one or multiple LADN DNNs among the LADN DNNs included in the second identification information do not match with any of the DNNs included in the LADN DNNs configured to the network, the network may include the LADN DNNs in the 15th identification information. In other words, in a case that one or multiple LADN DNNs which are included in the second identification information and do not match with any of the LADN DNNs configured to the network are present, the network may include the LADN DNNs in the 15th identification information.

Furthermore, the 15th identification information may be information selected and determined, by the network, based on the received second identification information and/or information correlated to the DN and/or information correlated to the NSI and/or network capability information and/or an operator policy and/or a network state and/or user registration information and/or the like. Furthermore, the 15th identification information may be information selected and determined based on another identification information which has been selected by the network in the present procedure.

26th identification information is information indicating the DNN. The 26th identification information may be information indicating the DNN requested by the UE. More specifically, the 26th identification information may be information indicating the DNN requested by the UE and correlated to a PDU session to be established in the present procedure. Furthermore, the 26th identification information may be information selected and determined based on one or more pieces of identification information among the 11th identification information to 17th identification information transmitted and/or received and/or a UE configuration and/or a UE state and/or a user policy and/or an application request.

Furthermore, 36th identification information is information indicating the DNN. The 36th identification information may be information indicating the DNN selected by the network. More specifically, the 36th identification information may be information indicating the DNN selected by the network and correlated to a PDU session to be established in the present procedure.

Furthermore, the 36th identification information may be information selected and determined, by the network, based on the received 36th identification information and/or information correlated to the NSI and/or network capability information and/or an operator policy and/or a network state and/or user registration information and/or the like. Furthermore, the 36th identification information may be information selected and determined based on another identification information which has been selected by the network in the present procedure.

Furthermore, 41st identification information is a cause value indicating a reason why the UE request is not allowed. The 41st identification information may be a 5GS Session Management (5GSM) cause value. Furthermore, the 41st identification information may be information indicating that the UE is located outside the LADN service area. Furthermore, the 41st identification information may be information used by the network in order to indicate that the UE is located outside the LADN service area.

Furthermore, as for the 41st identification information, the 41st identification information may be information indicating that the requested LADN is not allowed in the area to which the UE currently belongs. Note that the area to which the UE currently belongs may be an area including one or multiple tracking areas, or may be a LADN service area correlated to the LADN DNN.

Furthermore, the 41st identification information may be information selected and determined, by the network, based on the identification information received from the UE and/or network capability information and/or an operator policy and/or a network state and/or user registration information and/or the area to which the UE currently belongs and/or the like.

Furthermore, the 41st identification information may be a 46th 5GSM cause value indicating locating outside the LADN service. In other words, the 41st identification information may be a 5GSM cause #46 "out of LADN service area". Note that the 5GSM cause #46 "out of LADN service area" may be a cause value indicating that the UE is located outside the LADN service.

Furthermore, the 41st identification information may be a 5GS Mobility Management (5GMM) cause value. Furthermore, the 41st identification information may be information used in a case that the AMF cannot transfer an SM message, such as a PDU session establishment request message received from the UE, to the SMF.

3.2. Description of Procedure Used in Each Embodiment

Next, a procedure used in each embodiment will be described. Note that procedures used in each embodiment includes a Registration procedure, a PDU session establishment procedure, and a UE configuration update procedure (Generic UE configuration update procedure). Each procedure will be described below.

Note that in each embodiment, as illustrated in FIG. 2, a case in which the HSS and the UDM, the PCF and the PCRF, the SMF and the PGW-C, and the UPF and the PGW-U are respectively configured as the same apparatuses (i.e., the same physical hardware, or the same logical hardware, or the same software) is described as an example. However, the contents described in the present embodiment can also be applied to a case that these are configured as different apparatuses (i.e., different physical hardware, or different logical hardware, or different software). For example, data may be directly transmitted and/or received among these apparatuses, or data may be transmitted and/or received via the N26 interface between the AMF and the MME, or data may be transmitted and/or received via the UE.

3.2.1. Registration Procedure

First, a Registration procedure will be described using FIG. 6. The registration procedure is a procedure at the 5GS. The present procedure hereinafter refers to the registration procedure. The registration procedure is a procedure for registration with the access network_B, and/or the core network_B, and/or the DN initiated by the UE. In a state of not being registered in the network, the UE can perform the present procedure at any timing such as the timing of turning on power, for example. In other words, the UE can initiate the present procedure at any timing in a deregistered state (RM-DEREGISTERED state). In addition, each apparatus (UE and AMF, in particular) can transition to a registered state (RM-REGISTERED state), based on the completion of the registration procedure.

Furthermore, the registration procedure may be a procedure for updating location registration information of the UE in the network, and/or for regularly notifying a state of the UE from the UE to the network, and/or for updating specific parameters related to the UE in the network.

The UE may initiate the registration procedure in a case that the UE applies mobility across TAs. In other words, the UE may initiate the registration procedure in a case that the UE moves to a TA different from a TA indicated in a TA list that the UE holds. Furthermore, the UE may initiate the present procedure in a case that a running timer expires. Furthermore, the UE may initiate the registration procedure in a case that a context of each apparatus needs to be updated due to disconnection or deactivation of a PDU session. Furthermore, the UE may initiate the registration procedure in a case that a change occurs in capability information and/or preference concerning PDU session establishment of the UE. Furthermore, the UE may initiate the registration procedure regularly. Furthermore, the UE may initiate the registration procedure based on the completion of the UE configuration update procedure. Note that, besides the above, the UE can perform the registration procedure at any timing.

Furthermore, the UE may initiate the registration procedure regularly, even in a case of being in a registered state. In other words, the UE may initiate the registration procedure based on the expiration of the timer. Furthermore, the UE may initiate the registration procedure in a state in which the LADN information is stored. Furthermore, the UE may initiate the registration procedure in a state in which the PDU session is established. Note that the PDU session may be a PDU session correlated to the LADN information, or may be a PDU session for LADN. Furthermore, the PDU session may be a PDU session correlated to the NSSAI.

Note that the registration procedure performed based on the mobility of the UE and the regularly performed registration procedure may be expressed as a registration procedure for mobility and registration update. In other words, the registration procedure for mobility and registration update may be a registration procedure performed based on the mobility of the UE, or may be a registration procedure which is regularly performed. Furthermore, the registration procedure for mobility and registration update may be a registration procedure performed based on the UE configuration update. Furthermore, the registration procedure for mobility and registration update may be a registration procedure performed to establish a communication path for transmitting and/or receiving user data. Furthermore, the registration procedure for mobility and registration update may be a registration procedure performed based on a request from the network. Furthermore, in other words, the registration procedure for mobility and registration update may be a registration procedure other than the initial registration procedure. Hereinafter, the registration procedure for mobility and registration update may be expressed as the present procedure.

Next, each step of the registration procedure will be described. Note that the registration procedure described below may be the initial registration procedure, or may be the registration procedure for mobility and registration update.

First, the UE transmits a Registration request message to the AMF (S800), (S802), and (S804) to initiate the registration procedure. Specifically, the UE transmits an RRC message including the registration request message to the 5G AN (or gNB) (S800). Note that the registration request message may be a NAS message. In addition, the RRC message may be a control message transmitted and/or received between the UE and the 5G AN (or gNB). Furthermore, the NAS message is processed in a NAS layer, and the RRC message is processed in an RRC layer. Note that the NAS layer is a layer higher than the RRC layer.

Here, the UE can transmit one or more pieces of identification information of at least the first identification information to the second identification information included in the registration request message and/or the RRC message, but may transmit these pieces of information included in a control message different from these messages, for example, a control message of a layer lower than the RRC layer (e.g., MAC layer, RLC layer, PDCP layer). Note that by transmitting these pieces of identification information, the UE may indicate that the UE supports each function, or may indicate a request of the UE. Furthermore, in a case that multiple pieces of identification information are transmitted and/or received, two or more pieces of identification information of these pieces of identification information may be configured as one or more pieces of identification information. Note that information indicating support of each function and information indicating the request for use of each function may be transmitted and/or received with the same identification information or may be transmitted and/or received as different identification information.

In a case of supporting expansion of the LADN service area, the UE may configure information indicating support of expansion of the LADN service area to the first identification information, or may transmit the first identification information indicating support of expansion of the LADN service area included in the registration request message. In contrast, in a case of not supporting expansion of the LADN service area, the UE may configure information indicating that expansion of the LADN service area is not supported to the first identification information, may transmit the first identification information indicating that expansion of the LADN service area is not supported included in the registration request message, or may not transmit the first identification information.

Furthermore, in a case of supporting a use restriction of expansion of the LADN service area, the UE may configure information indicating support of the use restriction of expansion of the LADN service area to the first identification information, or may transmit the first identification information indicating support of the use restriction of expansion of the LADN service area included in the registration request message. In contrast, in a case of not supporting a use restriction of expansion of the LADN service area, the UE may configure information indicating that the use restriction of expansion of the LADN service area is not supported to the first identification information, may transmit the first identification information indicating that the use restriction of expansion of the LADN service area is not supported included in the registration request message, or may not transmit the first identification information.

Furthermore, by transmitting the first identification information, the UE may indicate that the UE supports expansion of the LADN service area. In this case, the first identification information may be information indicating support of expansion of the LADN service area.

In contrast, by transmitting the first identification information, the UE may indicate that the UE supports a use restriction of expansion of the LADN service area. In this case, the first identification information may be information indicating support of the use restriction of expansion of the LADN service area.

In addition, by transmitting an SM message (e.g., PDU session establishment request message) included in the registration request message, or by transmitting the SM message (e.g., PDU session establishment request message) along with the registration request message, the UE may initiate a PDU session establishment procedure, during the registration procedure.

In a case of receiving an RRC message including the registration request message, the 5G AN (or gNB) selects the AMF to which the registration request message is transferred (S802). Note that the 5G AN (or gNB) can select the AMF based on information included in the registration request message and/or the RRC message. The 5G AN (or gNB) retrieves the registration request message from the received RRC message and transfers the registration request message to the selected AMF (S804).

In a case of having received the registration request message, the AMF can perform a first condition determination. The first condition determination is intended to determine whether the network (or AMF) accepts a request from the UE. The AMF initiates the procedure of (A) in FIG. 6 in a case that the first condition determination is true, whereas initiates the procedure of (B) in FIG. 6 in a case that the first condition determination is false.

Note that the first condition determination may be performed based on reception of the registration request message, and/or each identification information included in the registration request message, and/or subscriber information, and/or network capability information, and/or an operator policy, and/or a network state, and/or user registration information, and/or a context held by the AMF, and/or the like. For example, in a case that the network allows a request of the UE, the first condition determination may be true, and in a case that the network does not allow a request of the UE, the first condition determination may be false. Furthermore, in a case that the network of a registration destination of the UE and/or an apparatus in the network supports a function requested by the UE, the first condition determination may be true, and in a case that the function requested by the UE is not supported, the first condition determination may be false. Furthermore, in a case that identification information to be transmitted and/or received is allowed, the first condition determination may be true, and in a case that identification information to be transmitted and/or received is not allowed, the first condition determination may be false. Note that conditions for determining whether the first condition determination is true or false may not be limited to the above-described conditions.

First, a case that the first condition determination is true will be described. The AMF can first perform a fourth condition determination in the procedure of (A) in FIG. 6. The fourth condition determination is to determine whether the AMF transmits and/or receives an SM message to and/or from the SMF.

Note that the fourth condition determination may be performed based on whether or not the AMF has received the SM message. The fourth condition determination may also be performed based on whether or not the SM message is included in the registration request message. For example, the fourth condition determination may be true in a case that the AMF has received the SM message and/or in a case that the SM message is included in the registration request message, and the fourth condition determination may be false in a case that the AMF has not received the SM message and/or in a case that the SM message has not been included in the registration request message. Note that conditions for determining whether the fourth condition determination is true or false may not be limited to the above-described conditions.

In a case that the fourth condition determination is true, the AMF selects the SMF and transmits and/or receives the SM message to and/or from the selected SMF, whereas in a case that the fourth condition determination is false, does not perform such processes (S806). Furthermore, even in the case that the fourth condition determination is true, in a case of having received the SM message indicating rejection from the SMF, the AMF stops the procedure of (A) in FIG. 6 in some cases. At this time, the AMF can initiate the procedure of (B) in FIG. 6.

Note that in S806, the AMF can notify the SMF of identification information received through the registration request message in a case of transmitting and/or receiving the SM message to and/or from the SMF. The SMF can obtain the identification information received from the AMF by transmitting and/or receiving the SM messages to and/or from the AMF.

Next, the AMF transmits the Registration accept message to the UE via the 5G AN (or gNB) as a response message to the registration request message based on the reception of the registration request message and/or the completion of the transmission and/or reception of the SM message to and/or from the SMF (S808). For example, in the case that the fourth condition determination is false, the AMF may transmit the registration accept message based on reception of the registration request message from the UE. Furthermore, in the case that the fourth condition determination is true, the AMF may transmit the registration accept message based on the completion of transmission and/or reception of the SM message to and/or from the SMF. Note that the registration accept message is a NAS message transmitted and/or received on the N1 interface, but transmitted and/or received by being included in an RRC message between the UE and the 5G AN (gNB).

The AMF may transmit at least one or more pieces of identification information among the 11th identification information to the 15th identification information, included in the registration accept message. Note that by transmitting these pieces of identification information, the AMF may indicate that the network supports each function, or may indicate that the request of the UE has been accepted. Furthermore, in a case that multiple pieces of identification information are transmitted and/or received, two or more pieces of identification information of these pieces of identification information may be configured as one or more pieces of identification information. Note that information indicating support of each function and information indicating the request for use of each function may be transmitted and/or received with the same identification information or may be transmitted and/or received as different identification information.

In a case of supporting expansion of the LADN service area, the AMF may configure information indicating support of expansion of the LADN service area to the 11th identification information, or may transmit the 11th identification information indicating support of expansion of the LADN service area included in the registration accept message. In contrast, in a case of not supporting expansion of the LADN service area, the AMF may configure information indicating that expansion of the LADN service area is not supported to the 11th identification information, may transmit the 11th identification information indicating that expansion of the LADN service area is not supported included in the registration accept message, or may not transmit the 11th identification information.

Furthermore, in a case of supporting a use restriction of expansion of the LADN service area, the AMF may configure information indicating support of the use restriction of expansion of the LADN service area to the 11th identification information, or may transmit the 11th identification information indicating support of the use restriction of expansion of the LADN service area included in the registration accept message. In contrast, in a case of not supporting a use restriction of expansion of the LADN service area, the AMF may configure information indicating that the use restriction of expansion of the LADN service area is not supported to the 11th identification information, may transmit the 11th identification information indicating that the use restriction of expansion of the LADN service area is not supported included in the registration accept message, or may not transmit the 11th identification information.

Furthermore, by transmitting the 11th identification information, the AMF may indicate that the network supports expansion of the LADN service area. Furthermore, by transmitting the 11th identification information, the AMF may indicate that expansion of the LADN service area can be used. Furthermore, by transmitting the 11th identification information, the AMF may indicate that the network has allowed use of expansion of the LADN service area. In this case, the 11th identification information may be information indicating support of expansion of the LADN service area.

In contrast, by transmitting the 11th identification information indicating that expansion of the LADN service area is not supported or by not transmitting the 11th identification information, the AMF may indicate that the network does not support expansion of the LADN service area. Furthermore, by transmitting the 11th identification information indicating that expansion of the LADN service area is not supported or by not transmitting the 11th identification information, the AMF may indicate that expansion of the LADN service area cannot be used. Furthermore, by transmitting the 11th identification information indicating that expansion of the LADN service area is not supported or by not transmitting the 11th identification information, the AMF may indicate that the network does not allow use of expansion of the LADN service area.

Furthermore, by transmitting the 11th identification information, the AMF may indicate that the network supports a use restriction of expansion of the LADN service area. Furthermore, by transmitting the 11th identification information, the AMF may indicate that use of expansion of the LADN service area is restricted. In this case, the 11th identification information may be information indicating support of a use restriction of expansion of the LADN service area.

In contrast, by transmitting the 11th identification information indicating that a use restriction of expansion of the LADN service area is not supported or by not transmitting the 11th identification information, the AMF may indicate that the network does not support the use restriction of expansion of the LADN service area. Furthermore, by transmitting the 11th identification information indicating that the use restriction of expansion of the LADN service area is not supported or by not transmitting the 11th identification information, the AMF may indicate that use of expansion of the LADN service area is not restricted.

Here, the AMF may transmit the 11th identification information based on the first identification information. Specifically, in a case that the first identification information is information indicating support of expansion of the LADN service area, the AMF may transmit to the UE the 11th identification information indicating support of expansion of the LADN service area. In contrast, in a case that the first identification information is information indicating that expansion of the LADN service area is not supported, the AMF may transmit to the UE the 11th identification information indicating that expansion of the LADN service area is not supported.

Furthermore, in a case that the first identification information is information indicating support of a use restriction of expansion of the LADN service area and the AMF has determined to restrict use of expansion of the LADN service area, the AMF may configure information indicating the use restriction of expansion of the LADN service area to the 11th identification information, or may transmit to the UE the 11th identification information indicating the use restriction of expansion of the LADN service area. In contrast, in the case that the first identification information is information indicating that expansion of the LADN service area is not supported, the AMF may not transmit the 11th identification information.

Furthermore, by transmitting the 12th identification information, the AMF may indicate that the network supports the LADN or allows connection to the LADN. Furthermore, by transmitting the 12th identification information, the AMF may notify the UE of a list of DNNs available in connection to the LADN and/or the LADN service area, which is an area where connection to the LADN is possible. Furthermore, by transmitting the 12th identification information, the AMF may notify the UE of one or multiple pieces of S-NSSAI available in connection to the LADN. Note that the S-NSSAI available in connection to the LADN, and the DNN available in connection to the LADN and/or the LADN service area may be associated with each other.

Here, the AMF may transmit the 12th identification information based on the first identification information. Specifically, in the case that the first identification information is information indicating support of expansion of the LADN service area, the AMF may configure the expanded LADN service area as the LADN service area, may configure the expanded LADN information as the LADN information, or may transmit the configured LADN information to the UE as the 12th identification information. In contrast, in the case that the first identification information is information indicating that expansion of the LADN service area is not supported, the AMF may configure the existing LADN service area as the LADN service area, may configure the existing LADN information as the LADN information, or may transmit the configured LADN information to the UE as the 12th identification information.

In contrast, by not transmitting the 12th identification information, the AMF may indicate that the network does not support the LADN or does not allow connection to the LADN. Furthermore, by not transmitting the 12th identification information, the AMF may indicate that the LADN information stored by the UE is invalid, or may indicate to the UE deactivation of the LADN information stored by the UE. Furthermore, by not transmitting the 12th identification information, the AMF may indicate that the LADN information stored by the UE needs to be deleted, or may indicate to the UE deletion of the LADN information stored by the UE.

Furthermore, by transmitting the 12th identification information which contains nothing, the AMF may indicate that the network does not support the LADN or does not allow connection to the LADN. Furthermore, by transmitting the 12th identification information which contains nothing, the AMF may indicate that the LADN information stored by the UE is invalid, or may indicate to the UE deactivation of the LADN information stored by the UE. Furthermore, by transmitting the 12th identification information which contains nothing, the AMF may indicate that the LADN information stored by the UE needs to be deleted, or may indicate to the UE deletion of the LADN information stored by the UE.

Here, the AMF may transmit the 12th identification information based on the second identification information. Specifically, in a case that the second identification information indicates a request for the LADN information, the AMF may include the 12th identification information in the registration accept message, or may transmit the 12th identification information to the UE. Furthermore, in a case that the second identification information indicates a request for updating of the LADN information as well, the AMF may include the 12th identification information in the registration accept message, or may transmit the 12th identification information to the UE. In contrast, in a case that the second identification information indicates a request for deletion of the LADN information, the AMF may not include the 12th identification information in the registration accept message, or may not transmit the 12th identification information to the UE. Furthermore, in the case that the second identification information indicates a request for deletion of the LADN information, the AMF may include the 12th identification information which contains nothing in the registration accept message, or may transmit the 12th identification information which contains nothing to the UE.

Furthermore, in a case that the LADN information stored in the UE is desired to be deactivated, the AMF may not include the 12th identification information in the registration accept message, or may not transmit the 12th identification information to the UE. Furthermore, in the case that the LADN information stored in the UE is desired to be deactivated, the AMF may include the 12th identification information which contains nothing in the registration accept message, or may transmit the 12th identification information which contains nothing to the UE. Furthermore, in a case that the LADN information stored in the UE is desired to be deleted, the AMF may not include the 12th identification information in the registration accept message, or may not transmit the 12th identification information to the UE. Furthermore, in the case that the LADN information stored in the UE is desired to be deleted, the AMF may include the 12th identification information which contains nothing in the registration accept message, or may transmit the 12th identification information which contains nothing to the UE.

Furthermore, in a case that the AMF does not include the 12th identification information in the registration accept message during the registration procedure for mobility and registration update, the AMF may recognize old LADN information as invalid, or may delete the old LADN information. In this case, in a case that a PDU session for LADN is established, the AMF may locally release the PDU session for LADN, or may request the SMF to locally release the PDU session for LADN.

To be more specific, in the case that the AMF does not include the 12th identification information in the registration accept message during the registration procedure for mobility and registration update, the AMF may recognize the old LADN information as invalid, or may delete the old LADN information. In this case, in a case that one or multiple PDU sessions for LADN are established, the AMF may locally release all the PDU sessions for LADN, or request the SMF to locally release all the PDU sessions for LADN.

Furthermore, in the case that the AMF does not include the 12th identification information in the registration accept message during the registration procedure for mobility and registration update, the AMF may recognize old LADN information as invalid, or may delete the old LADN information. In this case, in the case that the PDU session for LADN is established, the AMF may request the SMF to release the PDU session for LADN. In this case, the SMF may initiate a PDU session release procedure of a network request.

To be more specific, in the case that the AMF does not include the 12th identification information in the registration accept message during the registration procedure for mobility and registration update, the AMF may recognize the old LADN information as invalid, or may delete the old LADN information. In this case, in the case that one or multiple PDU sessions for LADN are established, the AMF may request the SMF to release all the PDU sessions for LADN. In this case, the SMF may initiate the PDU session release procedure of the network request.

Furthermore, in a case that the LADN information correlated to the PDU session for LADN is not included in the registration accept message, the AMF may recognize old LADN information as invalid, or may delete the old LADN information. In this case, the AMF may locally release the PDU session for LADN, or request the SMF to locally release the PDU session for LADN.

Furthermore, in the case that the LADN information correlated to the PDU session for LADN is not included in the registration accept message, the AMF may recognize old LADN information as invalid, or may delete the old LADN information. In this case, the AMF may request the SMF to release the PDU session for LADN.

Furthermore, in the case that the LADN information correlated to the PDU session for LADN is not included in the registration accept message, the AMF may recognize old LADN information as invalid, or may delete the old LADN information. In this case, the AMF may request the SMF to release the PDU session for LADN. In this case, the SMF may initiate the PDU session release procedure of the network request.

Furthermore, in the case that the LADN information correlated to the PDU session for LADN is not included in the registration accept message, the AMF may recognize old LADN information as invalid, or may delete the old LADN information. In this case, the AMF may request the SMF to release the PDU session for LADN. In this case, the SMF may initiate the PDU session release procedure of the network request.

Furthermore, by transmitting the 13th identification information, the AMF may indicate the granularity of the LADN service area. More specifically, by transmitting the 13th identification information along with the 12th identification information, the AMF may indicate the granularity of the LADN service area indicated by the LADN service area information included in the LADN information indicated by the 12th identification information, or may notify an area that can be used as the LADN service area. Specifically, by transmitting the 13th identification information along with the 12th identification information, the AMF may indicate that the LADN service area indicated by the LADN service area information included in the 12th identification information is an area including one or multiple tracking areas, or may indicate that the area is an area different from the area including one or multiple tracking areas. Furthermore, by transmitting the 13th identification information along with the 12th identification information, the AMF may indicate that the tracking area ID list is included, may indicate that information requiring assistance of the RAN is included, or may indicate that information not requiring assistance of the RAN is included, as the LADN service area information.

Here, the AMF may determine whether or not to transmit the 13th identification information based on the first identification information. Specifically, in a case that the first identification information is information indicating support of expansion of the LADN service area, the AMF may transmit the 13th identification information to the UE. In contrast, in a case that the first identification information is information indicating that expansion of the LADN service area is not supported, the AMF may not transmit the 13th identification information to the UE.

Furthermore, by transmitting the 14th identification information, the AMF may indicate a period in which the LADN service area is valid. More specifically, by transmitting the 14th identification information along with the 12th identification information, the AMF may indicate the period in which the LADN service area indicated by the LADN service area information included in the LADN information indicated by the 12th identification information is valid.

Here, the AMF may determine whether or not to transmit the 14th identification information based on the first identification information. Specifically, in a case that the first identification information is information indicating support of expansion of the LADN service area, the AMF may transmit the 14th identification information to the UE. In contrast, in a case that the first identification information is information indicating that expansion of the LADN service area is not supported, the AMF may not transmit the 14th identification information to the UE.

Furthermore, by transmitting the 11th identification information and/or the 13th identification information and/or the 14th identification information along with the 12th identification information, the AMF may indicate that the expanded LADN information and/or the expanded LADN service area can be used, or may notify of the LADN information and/or the LADN service area information that can be used. In this case, the 11th identification information may be information indicating support of expansion of the LADN service area, and the 12th identification information may be the expanded LADN information.

Conversely, by transmitting the 11th identification information and/or the 12th identification information and by not transmitting the 13th identification information and/or the 14th identification information, the AMF may indicate that the expanded LADN information and/or the expanded LADN service area cannot be used. In other words, by transmitting the 11th identification information and/or the 12th identification information and by not transmitting the 13th identification information and/or the 14th identification information, the AMF may indicate that the existing LADN information and/or the existing LADN service area can be used, or may notify of the LADN information and/or the LADN service area information that can be used. In this case, the 11th identification information may be information indicating that expansion of the LADN service area is not supported, and the 12th identification information may be the existing LADN information.

Furthermore, by transmitting the 12th identification information and by not transmitting the 11th identification information and/or the 13th identification information and/or the 14th identification information, the AMF may indicate that the expanded LADN information and/or the expanded LADN service area cannot be used. In other words, by transmitting the 12th identification information and by not transmitting the 11th identification information and/or the 13th identification information and/or the 14th identification information, the AMF may indicate that the existing LADN information and/or the existing LADN service area can be used, or may notify of the LADN information and/or the LADN service area information that can be used. In this case, the 12th identification information may be the existing LADN information.

Furthermore, based on reception of the second identification information and/or the DNN list held by the AMF, the AMF may determine whether or not to include the 12th identification information in a registration procedure message, or may determine which LADN DNN to include in the 12th identification information. Furthermore, the AMF may include the selected and/or determined LADN DNN in the 12th identification information. Conversely, the AMF may not include LADN DNN which is not selected and/or not performed in the 12th identification information. Here, the DNN list held by the AMF may be a list of DNNs correlated to subscriber information of the UE.

Specifically, in a case that one or multiple LADN DNNs among the LADN DNNs included in the second identification information do not match with any of the DNNs included in the DNN list held by the AMF, the AMF may not include the LADN DNNs in the 12th identification information. In other words, in a case that one or multiple LADN DNNs which are included in the second identification information and do not match with any of DNNs included in the DNN list held by the AMF are present, the AMF may not include the LADN DNNs in the 12th identification information.

Conversely, even in the case that one or multiple LADN DNNs among the LADN DNNs included in the second identification information do not match with any of the DNNs included in the DNN list held by the AMF, the AMF may include the one or multiple LADN DNNs and the LADN DNNs in the 12th identification information. In other words, even in the case that one or multiple LADN DNNs which are included in the second identification information and do not match with any of DNNs included in the DNN list held by the AMF are present, the AMF may include the one or multiple LADN DNNs and the LADN DNNs in the 12th identification information. Here, the LADN DNN included in the 12th identification information may be the LADN DNN included in the DNN list held by the AMF, or may be the default LADN DNN. Note that the LADN DNN included in the 12th identification information is not limited to those described above, and may be arbitrary.

Furthermore, based on reception of the second identification information and/or the LADN DNN configured to the AMF, the AMF may determine whether or not to include the 12th identification information in the registration procedure message, or may determine which LADN DNN to include in the 12th identification information. Furthermore, the AMF may include the selected and/or determined LADN DNN in the 12th identification information. Conversely, the AMF may not include not-selected and/or not-performed LADN DNN in the 12th identification information.

Specifically, in a case that one or multiple LADN DNNs among the LADN DNNs included in the second identification information do not match with any of the LADN DNNs configured to the AMF, the AMF may not include the LADN DNNs in the 12th identification information. In other words, in a case that one or multiple LADN DNNs which are included in the second identification information and do not match with any of the LADN DNNs configured to the AMF are present, the AMF may not include the LADN DNNs in the 12th identification information.

Conversely, even in the case that one or multiple LADN DNNs among the LADN DNNs included in the second identification information do not match with any of the LADN DNNs configured to the AMF, the AMF may include the one or multiple LADN DNNs and the LADN DNNs in the 12th identification information. In other words, even in the case that one or multiple LADN DNNs which are included in the second identification information and do not match with any of the LADN DNNs configured to the AMF are present, the AMF may include the one or multiple LADN DNNs and the LADN DNNs in the 12th identification information. Here, the LADN DNN included in the 12th identification information may be the LADN DNN configured to the AMF, or may be the default LADN DNN. Note that the LADN DNN included in the 12th identification information is not limited to those described above, and may be arbitrary.

Furthermore, by transmitting the 12th identification information not including one or multiple LADN DNNs, the AMF may indicate that a request for the LADN information for a LADN DNN not included in the 12th identification information has failed. Furthermore, by transmitting the 12th identification information not including one or multiple LADN DNNs, the AMF may indicate that re-performing a registration procedure for requesting new LADN information for a LADN DNN not included in the 12th identification information is prohibited. Here, the LADN DNN not included in the 12th identification information may be one or multiple LADN DNNs among the LADN DNNs that has been included in the second identification information.

In other words, in a case that one or multiple LADN DNNs which are included in the second identification information and are not included in the 12th identification information are present, the AMF may indicate that a request for the LADN information for the LADN DNNs has failed. Furthermore, in other words, in the case that one or multiple LADN DNNs which are included in the second identification information and are not included in the 12th identification information are present, the AMF may indicate that re-performing a registration procedure for requesting new LADN information for the LADN DNNs is prohibited.

Furthermore, based on reception of the second identification information and/or the DNN list held by the AMF, the AMF may determine whether or not to include the 15th identification information in the registration procedure message, or may determine which LADN DNN to include in the 15th identification information. Here, the DNN list held by the AMF may be a list of DNNs correlated to subscriber information of the UE.

Specifically, in a case that one or multiple LADN DNNs among the LADN DNNs included in the second identification information do not match with any of the DNNs included in the DNN list held by the AMF, the AMF may include the LADN DNNs in the 15th identification information. In other words, in a case that one or multiple LADN DNNs which are included in the second identification information and do not match with any of DNNs included in the DNN list held by the AMF are present, the AMF may include the LADN DNNs in the 15th identification information.

Furthermore, based on reception of the second identification information and/or the LADN DNN configured to the AMF, the AMF may determine whether or not to include the 15th identification information in the registration procedure message, or may determine which LADN DNN to include in the 15th identification information.

Specifically, in a case that one or multiple LADN DNNs among the LADN DNNs included in the second identification information do not match with any of the LADN DNNs configured to the AMF, the AMF may include the LADN DNNs in the 15th identification information. In other words, in a case that one or multiple LADN DNNs which are included in the second identification information and do not match with any of the LADN DNNs configured to the AMF are present, the AMF may include the LADN DNNs in the 15th identification information.

Furthermore, by transmitting the 15th identification information, the AMF may indicate that a request for the LADN information for the LADN DNN included in the 15th identification information has failed. Furthermore, by transmitting the 15th identification information, the AMF may indicate that re-performing a registration procedure for requesting new LADN information for the LADN DNN included in the 15th identification information is prohibited.

Furthermore, even in a case of not including one or multiple LADN DNNs in the 12th identification information, or even in a case of including one or multiple LADN DNNs in the 15th identification information, the AMF may include a LADN DNN allowed by the network in the 12th identification information. Here, the LADN DNN allowed by the network may be the LADN DNN included in the DNN list held by the network, or may be the LADN DNN configured to the AMF. Furthermore, the LADN DNN allowed by the network may be a valid LADN DNN in the current registration area.

Note that the AMF may select and determine which identification information among the 11th identification information to the 15th identification information to include in the registration accept message, based on each piece of received identification information, and/or subscriber information, and/or network capability information, and/or an operator policy, and/or a network state, and/or user registration information, and/or a context held by the AMF, and/or the like.

Furthermore, the AMF can transmit an SM message (e.g., PDU session establishment accept message) included in the registration accept message, or can transmit the SM message (e.g., PDU session establishment accept message) along with the registration accept message. Note that this transmission method may be performed in a case that the SM message (e.g., PDU session establishment request message) is included in the registration request message and the fourth condition determination is true. Furthermore, the transmission method may be performed in a case that the registration request message and the SM message (e.g., the PDU session establishment request message) are included and the fourth condition determination is true. The AMF can indicate that the procedure for SM has been accepted in the registration procedure by performing such a transmission method.

Furthermore, the AMF may indicate that the request of the UE is accepted by transmitting a registration accept message, based on each piece of received identification information, and/or subscriber information, and/or network capability information, and/or an operator policy, and/or a network state, and/or user registration information, and/or a context held by the AMF, and/or the like.

Furthermore, the AMF may transmit information indicating that some requests of the UE have been rejected included in the registration accept message, or by transmitting information indicating that some requests of the UE have been rejected, may indicate a reason why some requests of the UE have been rejected. Furthermore, by receiving information indicating that some requests of the UE have been rejected, the UE may recognize the reason why some requests of the UE have been rejected. Note that the reason for rejection may be information indicating that the content indicated by the identification information received by the AMF is not allowed.

The UE receives the registration accept message via the 5G AN (gNB) (S808). By receiving the registration accept message, the UE can recognize that the request of the UE by the registration request message has been accepted, and the contents of various types of identification information included in the registration accept message.

The UE can further transmit a registration complete message to the AMF via the 5G AN (gNB), as a response message to the registration accept message (S810). Note that, in a case that the UE has received the SM message such as the PDU session establishment accept message, the UE may transmit an SM message such as a PDU session establishment complete message included in the registration complete message, or may include the SM message therein to indicate that the procedure for SM has been completed. Here, the registration complete message is a NAS message transmitted and/or received on the N1 interface, but transmitted and/or received by being included in an RRC message between the UE and the 5G AN (gNB).

The AMF receives the registration complete message via the 5G AN (gNB) (S810). In addition, each apparatus completes the procedure of (A) in FIG. 6 based on the transmission and/or reception of the registration accept message and/or the registration complete message.

Next, a case that the first condition determination is false will be described. The AMF transmits a Registration reject message to the UE via the 5G AN (gNB) as a response message to the registration request message in the procedure of (B) in FIG. 6 (S812). Here, the registration reject message is a NAS message transmitted and/or received on the N1 interface, but transmitted and/or received by being included in an RRC message between the UE and the 5G AN (gNB).

Note that the AMF may indicate that a request of the UE by the registration request message has been rejected, by transmitting the registration reject message. Furthermore, the AMF may transmit information indicating a reason for rejection included in the registration reject message, or may indicate the reason for rejection by transmitting the reason for rejection. Furthermore, by receiving the information indicating the reason why the request of the UE has been rejected, the UE may recognize the reason why the request of the UE has been rejected. Note that the reason for rejection may be information indicating that the content indicated by the identification information received by the AMF is not allowed.

The UE receives the registration reject message via the 5G AN (gNB) (S812). By receiving the registration reject message, the UE can recognize that the request of the UE by the registration request message has been rejected, and the contents of various types of identification information included in the registration reject message. Furthermore, in a case that the registration reject message is not received even in a case that a prescribed period has passed after transmitting the registration request message, the UE may recognize that the request of the UE has been rejected. Each apparatus completes the procedure of (B) in the present procedure based on the transmission and/or reception of the registration reject message.

Figure 6:
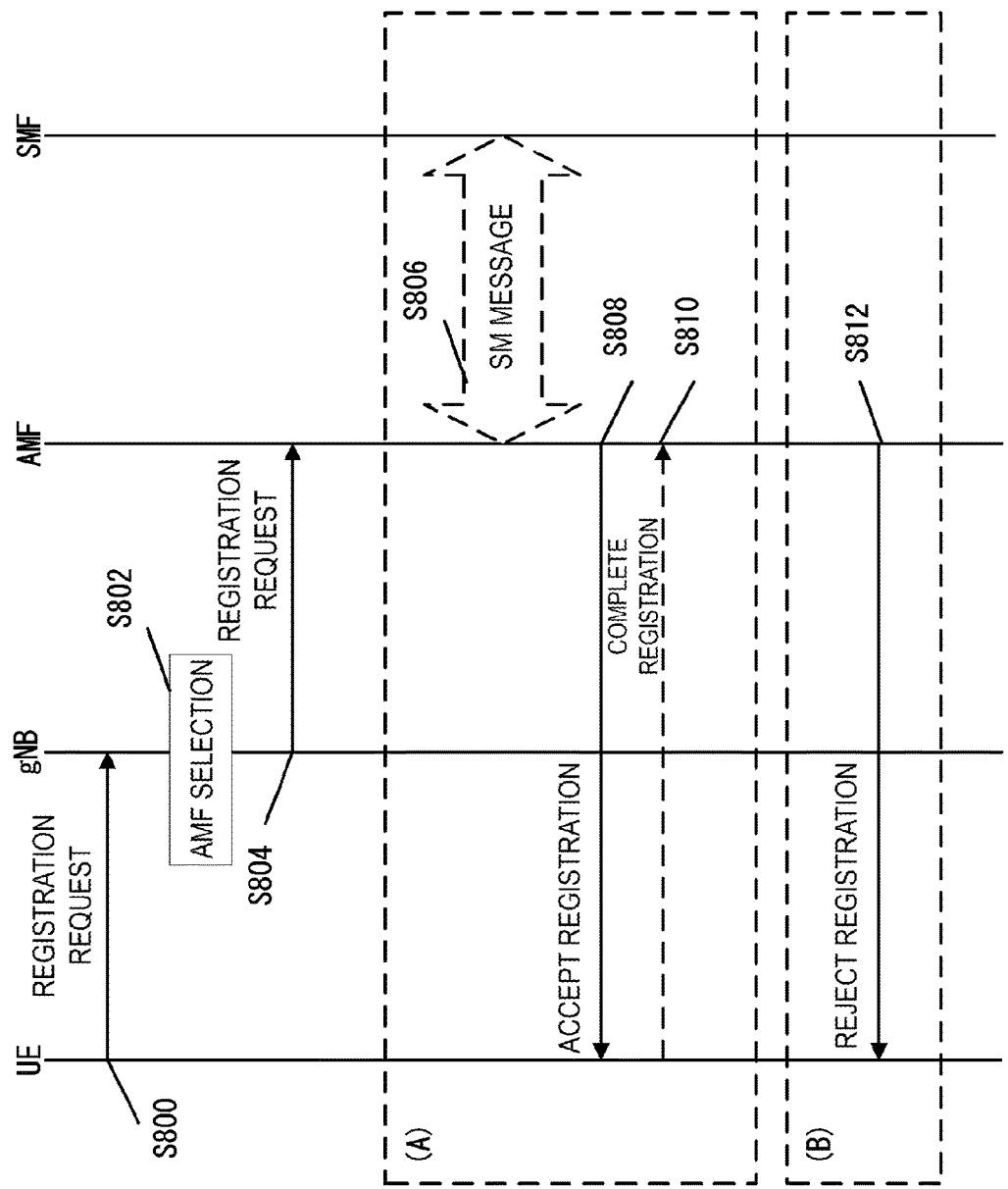
FIG. 6 is a diagram illustrating a registration procedure.

Note that the procedure of (B) in FIG. 6 may be initiated in a case that the procedure of (A) in FIG. 6 is stopped. In the procedure of (A) in FIG. 6, in a case that the fourth condition determination is true, the AMF may transmit an SM message, such as a PDU session establishment reject message, indicating rejection included in the registration reject message, or may include the SM message indicating rejection therein to indicate that the procedure for SM has been rejected. In that case, the UE may further receive the SM message, such as the PDU session establishment reject message, that indicates rejection, or may recognize that the procedure for SM has been rejected.

Each apparatus completes the registration procedure, based on the completion of the procedure of (A) or (B) in FIG. 6. Note that each apparatus may transition to a state in which the UE is registered with the network (RM REGISTERED state) based on the completion of the procedure of (A) in FIG. 6, may maintain a state in which the UE is not registered with the network (RM DEREGISTERED state) based on the completion of the procedure of (B) in FIG. 6, or may transition to a state in which the UE is not registered with the network. In addition, transition to each state of each apparatus may be performed based on completion of the registration procedure, or may be performed based on an establishment of a PDU session.

Furthermore, each apparatus may perform processing based on information transmitted and/or received in the registration procedure, based on completion of the registration procedure. For example, in a case of having transmitted and/or received information indicating that some requests of the UE have been rejected, a reason why the request of the UE has been rejected may be recognized. In addition, each apparatus may perform the present procedure again, based on the reason why the request of the UE has been rejected, or may perform a registration procedure for the core network_B or another cell.

Furthermore, based on the completion of the registration procedure, the UE may store identification information received along with the registration accept message and/or the registration reject message, or may recognize the determination of the network.

For example, in a case of having received the 11th identification information, the UE may recognize that the network supports expansion of the LADN service area. Furthermore, in the case of having received the 11th identification information, the UE may recognize that use of expansion of the LADN service area is allowed. In other words, in the case of having received the 11th identification information, the UE may recognize that not only an area including one or multiple tracking areas but also an area different from the area including one or multiple tracking areas can be configured as the LADN service area, or may recognize that the area can be used as the LADN service area. In the case of having received the 11th identification information, the UE may recognize that the LADN service area can be changed depending on time. In these cases, the 11th identification information may be information indicating support of expansion of the LADN service area. Furthermore, in these cases, the UE may establish a PDU session for LADN using the expanded LADN information and/or the expanded LADN service area, or may communicate with the LADN.

Conversely, in a case of having received the 11th identification information indicating that expansion of the LADN service area is not supported or in a case of not having received the 11th identification information, the UE may recognize that the network does not support expansion of the LADN service area. Furthermore, in the case of having received the 11th identification information indicating that expansion of the LADN service area is not supported or in the case of not having received the 11th identification information, the UE may recognize that use of expansion of the LADN service area is not allowed. In other words, in the case of having received the 11th identification information indicating that expansion of the LADN service area is not supported or in the case of not having received the 11th identification information, the UE may recognize that only an area including one or multiple tracking areas can be configured as the LADN service area, or may recognize that the area can be used as the LADN service area. In the case of having received the 11th identification information indicating that expansion of the LADN service area is not supported or in the case of not having received the 11th identification information, the UE may recognize that the LADN service area cannot be changed depending on time. In these cases, the UE may establish a PDU session for LADN using the existing LADN information and/or the existing LADN service area, or may communicate with the LADN.

Furthermore, in the case of having received the 11th identification information, the UE may recognize that the network supports a use restriction of expansion of the LADN service area. Furthermore, in the case of having received the 11th identification information, the UE may recognize that use of expansion of the LADN service area is restricted. In this case, the 11th identification information may be information indicating support of a use restriction of expansion of the LADN service area.

Conversely, in a case of having received the 11th identification information indicating that a use restriction of expansion of the LADN service area is not supported or in a case of not having received the 11th identification information, the UE may recognize that the network does not support the use restriction of expansion of the LADN service area. Furthermore, in the case of having received the 11th identification information indicating that a use restriction of expansion of the LADN service area is not supported or in the case of not having received the 11th identification information, the UE may recognize that use of expansion of the LADN service area is not restricted. Note that in a case that use of expansion of the LADN service area is restricted, the UE may be prohibited from using the expanded LADN service area.

Furthermore, in a case of having received the 12th identification information, the UE may recognize that the network supports the LADN, or may recognize that connection to the LADN has been allowed. Furthermore, in the case of having received the 12th identification information, the UE may recognize or store in a context a list of DNNs available in connection to the LADN and/or the LADN service area, which is an area where connection to the LADN is possible. Furthermore, in the case of having received the 12th identification information, the UE may recognize or store in a context one or multiple pieces of S-NSSAI available in connection to the LADN. Furthermore, the UE may recognize that the S-NSSAI available in connection to the LADN, and the DNN available in connection to the LADN and/or the LADN service area are associated with each other, or may associate with and store in a context the S-NSSAI available in connection to the LADN, and the DNN available in connection to the LADN and/or the LADN service area.

In other words, in the case of having received the 12th identification information, the UE may recognize that a PDU session for LADN correlated to the received LADN DNN can be established, or may recognize that a PDU session for LADN correlated to the received LADN S-NSSAI can be established. Furthermore, in the case of having received the 12th identification information, the UE may recognize that a PDU session for LADN correlated to a combination of the received LADN DNN and LADN S-NSSAI can be established.

Furthermore, in other words, in the case of having received the 12th identification information, the UE may recognize that the LADN service area is an area in which the PDU session for LADN correlated to the LADN DNN can be established, or may recognize that the LADN service area is an area in which the PDU session for LADN correlated to the LADN S-NSSAI can be established. Furthermore, in the case of having received the 12th identification information, the UE may recognize that the received LADN service area is an area in which the PDU session for LADN correlated to the combination of the LADN DNN and the LADN S-NSSAI can be established.

Conversely, in a case of not having received the 12th identification information, the UE may recognize that the network does not support the LADN, or may recognize that connection to the LADN is not allowed. Furthermore, in the case of not having received the 12th identification information, the UE may recognize that the LADN information stored by the UE is invalid, or may deactivate the LADN information stored by the UE. Furthermore, in the case of not having received the 12th identification information, the UE may recognize that the LADN information stored by the UE needs to be deleted, or may delete the LADN information stored by the UE.

Furthermore, in a case of having received the 12th identification information which contains nothing, the UE may recognize that the network does not support the LADN, or may recognize that connection to the LADN is not allowed. Furthermore, in the case of having received the 12th identification information which contains nothing, the UE may recognize that the LADN information stored by the UE is invalid, or may deactivate the LADN information stored by the UE. Furthermore, in the case of having received the 12th identification information which contains nothing, the UE may recognize that the LADN information stored by the UE needs to be deleted, or may delete the LADN information stored by the UE.

In these cases, in a case that the UE has a PDU session for LADN, the UE may locally release the PDU session for LADN. To be more specific, in these cases, in a case that the UE has one or multiple PDU sessions for LADN, the UE may locally release all the PDU sessions for LADN. Furthermore, in these cases, in the case that the UE has a PDU session for LADN, the PDU session for LADN may be released. To be more specific, in these cases, in the case that the UE has one or multiple PDU sessions for LADN, all the PDU sessions for LADN may be released.

Furthermore, in these cases, in the case that the UE has a PDU session for LADN, the UE may release the PDU session for LADN by a PDU session release procedure of a network request. Furthermore, in these cases, in the case that the UE has a PDU session for LADN, the UE may release the PDU session for LADN by a PDU session release procedure of a UE request. Furthermore, in these cases, in the case that the UE has a PDU session for LADN, the UE may initiate the PDU session release procedure of the UE request in order to release the PDU session for LADN.

Furthermore, in these cases, in a case that the UE has a PDU session correlated to old LADN information, the UE may locally release the PDU session. Furthermore, in these cases, in a case that the UE has one or multiple PDU sessions correlated to the old LADN information, the UE may locally release all the PDU sessions correlated to the old LADN information.

Furthermore, in a case that the AMF does not include the 12th identification information in the registration accept message during the registration procedure for mobility and registration update, the UE may delete the old LADN information. In this case, in a case that the UE has a PDU session for LADN, the UE may locally release the PDU session for LADN.

To be more specific, in the case that the AMF does not include the 12th identification information in the registration accept message during the registration procedure for mobility and registration update, the UE may delete the old LADN information. In this case, in a case that the UE has one or multiple PDU sessions for LADN, the UE may locally release all the PDU sessions for LADN.

Furthermore, in the case that the AMF does not include the 12th identification information in the registration accept message during the registration procedure for mobility and registration update, the UE may delete the old LADN information. In this case, in the case that the UE has a PDU session for LADN, the PDU session for LADN may be released.

To be more specific, in the case that the AMF does not include the 12th identification information in the registration accept message during the registration procedure for mobility and registration update, the UE may delete the old LADN information. In this case, in the case that the UE has one or multiple PDU sessions for LADN, all the PDU sessions for LADN may be released.

Furthermore, in the case that the AMF does not include the 12th identification information in the registration accept message during the registration procedure for mobility and registration update, the UE may delete the old LADN information. In this case, in the case that the UE has a PDU session for LADN, the UE may release the PDU session for LADN by a PDU session release procedure of a network request.

Furthermore, in the case that the AMF does not include the 12th identification information in the registration accept message during the registration procedure for mobility and registration update, the UE may delete the old LADN information. In this case, in the case that the UE has a PDU session for LADN, the UE may release the PDU session for LADN by a PDU session release procedure of the UE request.

Furthermore, in the case that the AMF does not include the 12th identification information in the registration accept message during the registration procedure for mobility and registration update, the UE may delete the old LADN information. In this case, in the case that the UE has a PDU session for LADN, the UE may initiate the PDU session release procedure of the UE request in order to release the PDU session for LADN.

Furthermore, in the case that the AMF does not include the 12th identification information in the registration accept message during the registration procedure for mobility and registration update, the UE may delete the old LADN information. In this case, in a case that the UE has a PDU session correlated to the old LADN information, the UE may locally release the PDU session.

Furthermore, in the case that the AMF does not include the 12th identification information in the registration accept message during the registration procedure for mobility and registration update, the UE may delete the old LADN information. In this case, in a case that the UE has one or multiple PDU sessions correlated to the old LADN information, the UE may locally release all the PDU sessions correlated to the old LADN information.

Furthermore, in a case that the old LADN information is deleted, the UE may recognize to be located outside the LADN service area. In addition, even in a case of being located outside the LADN service area, the UE may maintain a PDU session for LADN. Specifically, even in the case of being located outside the LADN service area, the UE may maintain the PDU session for LADN during a period until receiving a PDU session release command message. Note that the PDU session release command message may be a message transmitted and/or received in the PDU session release procedure of the network request, or may be a message transmitted and/or received in the PDU session release procedure of the UE request.

Here, the PDU session for LADN to be released described above may be a PDU session correlated to the old LADN information. In other words, the PDU session for LADN to be released may be a PDU session correlated to the LADN information to be deleted.

Furthermore, the PDU session release procedure of the network request may be a procedure initiated by the SMF transmitting the PDU session release command message to the UE. The UE may release the PDU session, in the PDU session release procedure of the network request, based on reception of the PDU session release command message from the SMF and/or completion of the PDU session release procedure of the network request.

Furthermore, the PDU session release procedure of the UE request may be a procedure initiated by the UE transmitting a PDU session release request message to the SMF. The UE, in the PDU session release procedure of the UE request, may receive the PDU session release command message from the SMF as a response message to the PDU session release request message, or may release the PDU session based on reception of the PDU session release command message from the SMF and/or completion of the PDU session release procedure of the UE request.

Note that the fact that each apparatus has a PDU session may mean that each apparatus has established the PDU session. Specifically, the fact that the UE has a PDU session may mean that the UE has established the PDU session. Furthermore, the fact that the AMF has a PDU session may mean that the AMF has established the PDU session. Furthermore, the fact that the SMF has a PDU session may mean that the SMF has established the PDU session.

Furthermore, the UE may recognize whether or not the LADN DNN requested by the UE is available based on the 12th identification information and/or the 15th identification information, or may recognize whether or not a registration procedure for requesting new LADN information for the same LADN DNN is prohibited.

For example, in a case that the LADN DNN requested by the UE is included in the 12th identification information, the UE may recognize that the LADN DNN requested by the UE is not available. Conversely, in a case that the LADN DNN requested by the UE is not included in the 12th identification information and/or in a case that the LADN DNN requested by the UE is included in the 15th identification information, the UE may recognize that the LADN DNN requested by the UE is not available. Furthermore, in a case that a LADN DNN other than the LADN DNN requested by the UE is included in the 12th identification information, the UE may recognize that the LADN DNN requested by the UE is not available, or may recognize a available LADN DNN other than that requested by the UE. Note that in a case of having recognized that the LADN DNN is available, the UE may initiate the PDU session establishment procedure using the LADN DNN in a state of being located in the LADN service area correlated to the LADN DNN.

Furthermore, in a case that one or multiple LADN DNNs which are included in the second identification information and are not included in the 12th identification information are present, the UE may be prohibited from initiating again a registration procedure for requesting new LADN information for the LADN DNN. In other words, in a case of having received the 12th identification information that does not include one or multiple LADN DNNs among the LADN DNNs included in the second identification information, the UE may be prohibited from initiating again the registration procedure for requesting the new LADN information for the LADN DNN.

Furthermore, in a case that the 15th identification information is included in the registration accept message, the UE may be prohibited from initiating again a registration procedure for requesting new LADN information for the LADN DNN included in the 15th identification information. In other words, in a case that one or multiple LADN DNNs which are included in the 15th identification information are present, the UE may be prohibited from initiating again the registration procedure for requesting the new LADN information for the LADN DNN.

Note that the registration procedure may be the registration procedure for mobility and registration update. Furthermore, the registration procedure may be a procedure for requesting the new LADN information. Furthermore, in a case of having received the LADN information in the registration procedure, the UE may store the received LADN information. Note that in the registration procedure, by transmitting the registration request message including the second identification information, the UE may request new LADN information, or may acquire the LADN information from the network. Furthermore, in the registration procedure, even in a case that the registration request message not including the second identification information has been transmitted, the UE may acquire the LADN information from the network.

Here, the UE may initiate the registration procedure in order to synchronize the network and the LADN information. Furthermore, the UE may initiate the registration procedure in order to avoid failure due to being located outside the LADN service area.

Furthermore, in a case that one or multiple LADN DNNs included in the second identification information and not included in the 12th identification information are present and the UE stores the LADN information of the LADN DNNs, the UE may delete the LADN information of the LADN DNNs. In other words, in a case of receiving the 12th identification information not including one or multiple LADN DNNs among the LADN DNNs included in the second identification information and the UE stores the LADN information of the LADN DNNs, the UE may delete the LADN information of the LADN DNNs.

Furthermore, in a case that the 15th identification information is included in the registration accept message and the UE stores the LADN information of the LADN DNN included in the 15th identification information, the UE may delete the LADN information of the LADN DNN. In other words, in a case that one or multiple LADN DNNs included in the 15th identification information are present and in a case that the UE stores the LADN information of the LADN DNNs, the UE may delete the LADN information of the LADN DNNs.

Conversely, in a case that the UE stores the LADN information of the LADN DNN not included in the second identification information, the UE may not delete the LADN information of the LADN DNN for the LADN DNN.

The AMF may indicate that, by not including a LADN DNN in the 12th identification information, it is necessary to delete the LADN information of the LADN DNN stored by the UE. Furthermore, the AMF may indicate that, by including a LADN DNN in the 15th identification information, it is necessary to delete the LADN information of the LADN DNN stored by the UE.

Furthermore, in a case of having received the 13th identification information, the UE may recognize the granularity of the LADN service area. More specifically, in a case of having received the 13th identification information along with the 12th identification information, the UE may recognize the granularity of the LADN service area indicated by the LADN service area information included in the 12th identification information, or may store it in a context in association with the LADN service area information. Specifically, in the case of having received the 13th identification information along with the 12th identification information, as the granularity of the LADN service area, the UE may recognize that the LADN service area indicated by the LADN service area information is an area including one or multiple tracking areas, or may recognize that the area is an area different from the area including one or multiple tracking areas. Furthermore, in the case of having received the 13th identification information along with the 12th identification information, as the LADN service area information, the UE may recognize that the tracking area ID list is included, may recognize that information requiring assistance of the RAN is included, or may recognize that information not requiring assistance of the RAN is included.

Conversely, in a case of not having received the 13th identification information, the UE may use the default granularity as the granularity of the LADN service area. Furthermore, even in a case of having received the 13th identification information, in a case that the 13th identification information is invalid information and/or in a case that the UE does not support expansion of the LADN service area, the UE may ignore the received 13th identification information, or may use the default granularity as the granularity of the LADN service area. Here, the default granularity may be a granularity configured to the UE beforehand, or may be a granularity indicated by information previously received from the network. Furthermore, in a case of the default granularity, the LADN service area may be an area including one or multiple tracking areas, and the LADN service area information may be a tracking area ID list.

Note that in a case that multiple pieces of information indicating the LADN are included in the 12th identification information, the UE may store the granularity of the LADN service area in the context in association with the information indicating the LADN for each piece of information indicating the LADN. Furthermore, in a case that multiple pieces of LADN service area information are included in the 12th identification information, the UE may store the granularity of the LADN service area in the context in association with the LADN service area information for each piece of LADN service area information.

Furthermore, in a case of having received the 14th identification information, the UE may recognize a period in which the LADN service area is valid. More specifically, in a case of having received the 14th identification information along with the 12th identification information, the UE may recognize the period in which the LADN service area is valid indicated by the LADN service area information included in the 12th identification information, or may store it in a context in association with the LADN service area information.

Conversely, in a case of not having received the 14th identification information, the UE may use the default period as the period in which the LADN service area is valid. Furthermore, even in the case of having received the 14th identification information, in a case that the 14th identification information is invalid information and/or in a case that the UE does not support expansion of the LADN service area, the UE may ignore the received 14th identification information, or may use the default period as the period in which the LADN service area is valid. Here, the default period may be a period configured to the UE beforehand, or may be a period indicated by information previously received from the network. Furthermore, the default period may be a period until the LADN information is updated.

Note that in a case that multiple pieces of information indicating the LADN are included in the 12th identification information, the UE may store the period in which the LADN service area is valid in the context in association with the information indicating the LADN for each piece of information indicating the LADN. Furthermore, in a case that multiple pieces of LADN service area information are included in the 12th identification information, the UE may store the period in which the LADN service area is valid in the context in association with the LADN service area information for each piece of LADN service area information.

Furthermore, in a case of having received the 11th identification information and/or the 13th identification information and/or the 14th identification information along with the 12th identification information, the UE may recognize that the expanded LADN information and/or the expanded LADN service area can be used, or may store in the context the LADN information and/or the LADN service area information that can be used. Furthermore, in this case, the UE may recognize that the received LADN information is the expanded LADN information, or may store the received LADN information in the context as the expanded LADN information. Furthermore, in this case, the UE may recognize that the LADN service area indicated by the received LADN service area information is the expanded LADN service area, or may store the received LADN service area information in the context as the LADN service area information indicating the expanded LADN service area. In this case, the 11th identification information may be information indicating support of expansion of the LADN service area, and the 12th identification information may be the expanded LADN information.

Conversely, in a case of having received the 11th identification information and/or the 12th identification information and not having received the 13th identification information and/or the 14th identification information, and/or in a case of having received the 12th identification information and not having received the 11th identification information and/or the 13th identification information and/or the 14th identification information, the UE may recognize that the expanded LADN information and/or the expanded LADN service area cannot be used. Furthermore, in this case, the UE may recognize that the existing LADN information and/or the existing LADN service area can be used, or may store in the context the LADN information and/or the LADN service area information that can be used. Furthermore, in this case, the UE may recognize that the received LADN information is the existing LADN information, or may store the received LADN information in the context as the existing LADN information. Furthermore, in this case, the UE may recognize that the LADN service area indicated by the received LADN service area information is the existing LADN service area, or may store the received LADN service area information in the context as the LADN service area information indicating the existing LADN service area. In this case, the 11th identification information may be information indicating that expansion of the LADN service area is not supported, and the 12th identification information may be the existing LADN information.

Furthermore, in a case of having received the 12th identification information in a state in which the UE does not support expansion of the LADN service area, the UE may recognize that the expanded LADN information and/or the expanded LADN service area cannot be used. Furthermore, in this case, the UE may recognize that the existing LADN information and/or the existing LADN service area can be used, or may store in the context the LADN information and/or the LADN service area information that can be used. Furthermore, in this case, the UE may recognize that the received LADN information is the existing LADN information, or may store the received LADN information in the context as the existing LADN information. Furthermore, in this case, the UE may recognize that the LADN service area indicated by the received LADN service area information is the existing LADN service area, or may store the received LADN service area information in the context as the LADN service area information indicating the existing LADN service area. In this case, the 12th identification information may be the existing LADN information.

Furthermore, in a case of having received at least the 12th identification information and being located in the LADN service area indicated by the received information, the UE may recognize that a PDU session for LADN can be established, or may initiate a PDU session establishment procedure for establishing the PDU session for LADN. In other words, in a case of having received at least the 12th identification information and being located outside the LADN service area indicated by the received information, the UE may recognize that a PDU session for LADN cannot be established, or the PDU session establishment procedure for establishing the PDU session for LADN may be prohibited.

Furthermore, based on updating of the LADN information and/or determination of whether or not the UE is located in the LADN service area, the UE may initiate the PDU session establishment procedure for establishing the PDU session for LADN. Specifically, based on the determination that the UE is located in the LADN service area, the UE may initiate the PDU session establishment procedure for establishing the PDU session for LADN. Conversely, based on the determination that the UE is located outside the LADN service area, each apparatus may release the PDU session for LADN, or may release a user plane resource associated with the PDU session for LADN.

Here, the determination of whether or not the UE is located in the LADN service area may be performed based on the expanded LADN service area, or may be performed based on the existing LADN service area. In other words, in a case that each apparatus stores the expanded LADN service area, each apparatus may perform the determination of whether or not the UE is located in the LADN service area based on the expanded LADN service area. Conversely, in a case that each apparatus stores the existing LADN service area, each apparatus may perform the determination of whether or not the UE is located in the LADN service area based on the existing LADN service area.

Furthermore, in a case that the stored LADN service area is the tracking area ID list, it may be determined whether or not the UE is located in the LADN service area based on comparison between the LADN service area information stored by the UE and a tracking area ID acquired from the RAN. Specifically, in a case that the tracking area ID acquired from the RAN is included in the LADN service area information stored by the UE, the UE may recognize and store that the UE is located in the LADN service area. Conversely, in a case that the tracking area ID acquired from the RAN is not included in the LADN service area information stored by the UE, the UE may recognize and store that the UE is located outside the LADN service area.

Furthermore, in a case that the stored LADN service area is information requiring assistance of the RAN, it may be determined whether or not the UE is located in the LADN service area based on comparison between the LADN service area information stored by the UE and information acquired from the RAN. Specifically, in a case that the information acquired from the RAN is included in the LADN service area information stored by the UE, the UE may recognize and store that the UE is located in the LADN service area. Conversely, in a case that the information acquired from the RAN is not included in the LADN service area information stored by the UE, the UE may recognize and store that the UE is located outside the LADN service area.

Furthermore, in a case that the stored LADN service area is information not requiring assistance of the RAN, it may be determined whether or not the UE is located in the LADN service area based on comparison between the LADN service area information stored by the UE and information acquired from other than the RAN. Specifically, in a case that the information acquired from other than the RAN is included in the LADN service area information stored by the UE, the UE may recognize and store that the UE is located in the LADN service area. Conversely, in a case that the information acquired from other than the RAN is not included in the LADN service area information stored by the UE, the UE may recognize and store that the UE is located outside the LADN service area.

Furthermore, the determination of whether or not the UE is located in the LADN service area may be performed based on transmission and/or reception of a control message transmitted to the UE from the network. Specifically, the UE may recognize and store that the UE is located in the LADN service area based on reception of the control message from the network. Conversely, the UE may recognize and store that the UE is located outside the LADN service area based on reception of the control message from the network. Here, the control message transmitted from the network to the UE may be, for example, a control message for Location Services (LCS). Note that the determination of whether or not the UE is located in the LADN service area may not be limited to those described above.

Furthermore, in a period in which the LADN service area is valid, the UE may recognize that a PDU session for LADN can be established, or may initiate a PDU session establishment procedure for establishing the PDU session for LADN. In other words, outside the period in which the LADN service area is valid, the UE may recognize that the PDU session for LADN cannot be established, or the PDU session establishment procedure for establishing the PDU session for LADN may be prohibited.

Furthermore, based on updating of the LADN information and/or determination of activation of the LADN service area, the UE may initiate the PDU session establishment procedure for establishing the PDU session for LADN. Specifically, based on activation of the LADN service area, the UE may initiate the PDU session establishment procedure for establishing the PDU session for LADN. Conversely, based on deactivation of the LADN service area, each apparatus may release the PDU session for LADN established in association with the deactivated LADN service area, or may release a user plane resource associated with the PDU session for LADN.

Here, the determination of activation of the LADN service area may be performed based on information indicating a period in which the LADN service area is valid. Specifically, the UE compares a period in which the LADN service area is valid with the current time, and in a case that the current time is within the period in which the LADN service area is valid, the UE may determine that the LADN service area is valid. Conversely, the period in which the LADN service area is valid and the current time are compared, and in a case that the current time is outside the period in which the LADN service area is valid, the UE may determine that the LADN service area is invalid. Furthermore, based on the initiation of the period in which the LADN service area is valid indicated by the received information, the UE may activate the associated LADN service area. Conversely, based on the termination of the period in which the LADN service area is valid indicated by the received information, the UE may deactivate the associated LADN service area.

Furthermore, the determination of activation of the LADN service area may also be performed based on reception of a control message from the network. Specifically, in a case of having received the control message from the network, the UE may determine that the LADN service area is valid. Furthermore, in a case that it is not possible to receive the control message from the network, the UE may determine that the LADN service area is not valid. Conversely, in a case of having received reception of the control message from the network, the UE may determine that the LADN service area is not valid. Furthermore, in the case that it is not possible to receive the control message from the network, the UE may determine that the LADN service area is valid. Furthermore, based on the reception of the control message from the network, the UE may activate the LADN service area. Conversely, based on the reception of the control message from the network, the UE may deactivate the LADN service area. Note that the determination of activation of the LADN service area may not be limited to those described above.

3.2.2. PDU Session Establishment Procedure

Next, an overview of the PDU session establishment procedure performed to establish a PDU session to the DN will be described using FIG. 7. The PDU session establishment procedure is a procedure at the 5GS. As follows, the present procedure refers to a PDU session establishment procedure. The PDU session establishment procedure is a procedure for each apparatus to establish the PDU session. Note that each apparatus can initiate the PDU session establishment procedure at an arbitrary timing at which the registration procedure has completed and the registered state is obtained. In addition, each apparatus may be able to perform the PDU session establishment procedure in the registration procedure. Each apparatus may establish the PDU session, based on completion of the PDU session establishment procedure. Note that the PDU session establishment procedure may be a procedure led and initiated by the UE, or may be a procedure requested and initiated by the UE. Each apparatus can establish multiple PDU sessions by performing the PDU session establishment procedure multiple times.

Here, in a case that the PDU session establishment procedure is a PDU session establishment procedure for establishing a PDU session for LADN, each apparatus may establish the PDU session for LADN based on the completion of the PDU session establishment procedure. In other words, in a case that the PDU session establishment procedure is a PDU session establishment procedure using a LADN DNN, each apparatus may establish the PDU session for LADN based on the completion of the PDU session establishment procedure.

Furthermore, in a case of being located in an area where connection to the LADN is possible and/or in a case of being located in the LADN service area, the UE may initiate the PDU session establishment procedure in order to establish the PDU session for LADN. Conversely, in a case of being located outside the LADN service area, the UE may be prohibited from performing the PDU session establishment procedure for establishing the PDU session for LADN.

In other words, in a case that the UE is located in the area where connection to the LADN is possible and/or in a case that the UE is located in the LADN service area, each apparatus may perform the PDU session establishment procedure in order to establish the PDU session for LADN. Conversely, in a case that the UE is located outside the LADN service area, the network apparatus may reject a request for the PDU session establishment procedure for establishing the PDU session for LADN.

First, the UE transmits a NAS message including a PDU session establishment request message to the SMF via the 5G AN (gNB) and the AMF (S900), (S902), and (S904) to initiate a PDU session establishment procedure.

Specifically, the UE transmits the NAS message including the PDU session establishment request message to the AMF via the 5G AN (gNB) using the N1 interface (S900). Note that the NAS message including the PDU session establishment request message may be an MM message. Furthermore, the MM message may be an uplink NAS transport (UL NAS TRANSPORT) message. Here, a case that the expression "identification information and/or a value is included in the PDU session establishment request message" is used may mean that they are included in the MM message including the PDU session establishment request message.

Here, the UE can transmit at least the 26th identification information included in the PDU session establishment request message and/or the NAS message, but may transmit the information included in a control message different from these messages, for example, a control message of a layer lower than the RRC layer (e.g., MAC layer, RLC layer, PDCP layer). These pieces of identification information may indicate the UE request by being included in these messages. Furthermore, two or more pieces of identification information of these pieces of identification information may be configured as one or more pieces of identification information.

Furthermore, by transmitting the 26th identification information, the UE may indicate a request for establishment of a PDU session correlated to the DNN indicated by the 26th identification information, or may indicate the DNN requested by the UE. Note that the 26th identification information may be a DNN for identifying a DN that supports one or multiple functions indicated by the identification information transmitted and/or received along with the 26th identification information. In addition, the 26th identification information may be the DNN received in the registration procedure, or may be the LADN.

Here, in a case that the PDU session establishment procedure is a PDU session establishment procedure for establishing the PDU session for LADN, the UE may transmit a LADN DNN which is a DNN available in connection to the LADN included in the PDU session establishment request message. Furthermore, in the case that the PDU session establishment procedure is a PDU session establishment procedure for establishing the PDU session for LADN, the UE may transmit the LADN S-NSSAI which is S-NSSAI available in connection to the LADN also included in the PDU session establishment request message, or may transmit S-NSSAI associated to the LADN DNN also included therein.

In these cases, the UE may select the LADN DNN to be included in the PDU session establishment request message, from among the LADN DNNs included in the LADN information received prior to performing the PDU session establishment procedure, or may select the LADN DNN to be included in the PDU session establishment request message, from among the LADN DNNs stored by the UE.

Furthermore, the UE may select the LADN S-NSSAI to be included in the PDU session establishment request message, from among pieces of the LADN S-NSSAI included in the LADN information received prior to performing the PDU session establishment procedure, or may select the LADN S-NSSAI to be included in the PDU session establishment request message, from among the pieces of LADN S-NSSAI stored by the UE. Furthermore, the UE may select S-NSSAI associated with the LADN DNN to be included in the PDU session establishment request message, and may include the selected S-NSSAI in the PDU session establishment request message.

Furthermore, in a case that multiple LADN DNNs are included in the LADN information received prior to performing the PDU session establishment procedure and/or in a case that multiple LADN DNNs are stored, the UE may select a LADN DNN based on the LADN service area information and transmit the selected LADN DNN included in the PDU session establishment request message. Furthermore, in a case that multiple pieces of LADN S-NSSAI are included in the LADN information received prior to performing the PDU session establishment procedure and/or in a case that multiple pieces of LADN S-NSSAI are stored, the UE may select LADN S-NSSAI based on the LADN service area information and transmit the selected LADN S-NSSAI included in the PDU session establishment request message. To be more specific, in a case that multiple pieces of information indicating the LADN are included in the LADN information received prior to performing the PDU session establishment procedure and/or in a case that multiple pieces of information indicating the LADN are stored, the UE may select information indicating the LADN based on the LADN service area information and transmit the LADN DNN and/or the LADN S-NSSAI included in the selected information indicating the LADN, included in the PDU session establishment request message.

The AMF receives the NAS message including the PDU session establishment request message (S900), then retrieves the PDU session establishment request message from the NAS message, and selects the SMF as a transfer destination of the PDU session establishment request message (S902). Note that the AMF may select the SMF which is the transfer destination based on each identification information included in the PDU session establishment request message and/or the NAS message, and/or subscriber information, and/or network capability information, and/or an operator policy, and/or a network state, and/or user registration information, and/or a context held by the AMF, and/or the like.

The AMF transfers the PDU session establishment request message to the selected SMF via the N11 interface (S904).

The SMF receives the PDU session establishment request message (S904), then recognizes various types of identification information included in the PDU session establishment request message. Then, the SMF performs a third condition determination. The third condition determination is to determine whether or not the SMF accepts the request of the UE. In the third condition determination, the SMF determines whether the third condition determination is true or false. In a case that the third condition determination is true, the SMF initiates the procedure of (A) in FIG. 7, and in a case that the third condition determination is false, initiates the procedure of (B) in FIG. 7.

Note that the third condition determination may be performed based on the PDU session establishment request message, and/or each identification information included in the PDU session establishment request message, and/or subscriber information, and/or network capability information, and/or an operator policy, and/or a network state, and/or user registration information, and/or a context held by the SMF, and/or the like. For example, in a case that the network allows a request of the UE, the third condition determination may be true. In addition, in a case that the network does not allow a request of the UE, the third condition determination may be false. Furthermore, in a case that the network of a connection destination of the UE and/or an apparatus in the network supports a function requested by the UE, the third condition determination may be true, and in a case that the function requested by the UE is not supported, the third condition determination may be false. Furthermore, in a case that identification information to be transmitted and/or received is allowed, the third condition determination may be true, and in a case that identification information to be transmitted and/or received is not allowed, the third condition determination may be false. Note that conditions for determining whether the third condition determination is true or false may not be limited to the above-described conditions.

As follows, steps in a case that the third condition determination is true, in other words, each step of the procedure of (A) in FIG. 7 will be described. The SMF selects a UPF of an establishment destination of the PDU session, transmits a session establishment request message to the selected UPF via the N4 interface (S906), and initiates the procedure of (A) in FIG. 7.

Here, the SMF may select one or more UPFs based on each identification information acquired based on the reception of the PDU session establishment request message, and/or subscriber information, and/or network capability information, and/or an operator policy, and/or a network state, and/or user registration information, and/or a context held by the SMF, and/or the like. Note that in a case that multiple UPFs are selected, the SMF may transmit the session establishment request message to each UPF.

The UPF receives the session establishment request message from the SMF via the N4 interface (S906), and creates a context for the PDU session. In addition, the UPF transmits a session establishment response message to the SMF via the N4 interface based on the reception of the session establishment request message and/or the creation of the context for the PDU session (S908).

The SMF receives the session establishment response message from the UPF via the N4 interface as a response message to the session establishment request message (S908). The SMF may perform address assignment of an address to be assigned to the UE based on the reception of the PDU session establishment request message and/or the selection of the UPF and/or the reception of the session establishment response message.

The SMF transmits the PDU session establishment accept message to the UE via the AMF, based on the reception of the PDU session establishment request message, and/or the selection of the UPF, and/or the reception of the session establishment response message, and/or the completion of the address assignment of the address to be assigned to the UE (S910) (S912).

Specifically, the SMF transmits the PDU session establishment accept message to the AMF using the N11 interface (S910), and the AMF that has received the PDU session establishment request message transmits the NAS message including the PDU session establishment accept message to the UE using the N1 interface (S912). Note that the PDU session establishment accept message may be a NAS message, and may be a response message to the PDU session establishment request. Furthermore, the PDU session establishment accept message may be transmitted and/or received included in the MM message via the N1 interface. Furthermore, the MM message may be the NAS message, or may be a downlink NAS transport (DL NAS TRANSPORT) message. Here, a case that the expression "identification information and/or a value is included in the PDU session establishment accept message" is used may mean that they are included in the MM message including the PDU session establishment accept message. The PDU session establishment accept message can indicate that the establishment of the PDU session has been accepted.

Here, the SMF and AMF may indicate that the request of the UE by the PDU session establishment request has been accepted by transmitting the PDU session establishment accept message.

The SMF and the AMF may transmit at least the 36th identification information included in the PDU session establishment accept message. Note that by transmitting these pieces of identification information, the SMF and the AMF may indicate that the network supports each function, or may indicate that the request of the UE has been accepted. In addition, two or more pieces of identification information of these pieces of identification information may be configured as one or more pieces of identification information. Note that information indicating support of each function and information indicating the request for use of each function may be transmitted and/or received with the same identification information or may be transmitted and/or received as different identification information.

Furthermore, by transmitting the 36th identification information, the SMF and the AMF may indicate the acceptance of the establishment request of the PDU session correlated to the DNN indicated by the 36th identification information, or may indicate that the PDU session is established. Furthermore, the SMF and the AMF may indicate the DNN selected and determined by the network by transmitting the 36th identification information. Note that the 36th identification information may be a DNN for identifying a DN that supports one or multiple functions indicated by the identification information transmitted and/or received along with the 36th identification information. In addition, the 36th identification information may be the DNN transmitted in the registration procedure, or may be the LADN.

Note that the SMF and the AMF may select and determine whether or not to include at least the 36th identification information in the PDU session establishment accept message, based on each piece of the received identification information, and/or subscriber information, and/or network capability information, and/or an operator policy, and/or a network state, and/or user registration information, and/or a context held by the AMF, and/or the like.

In addition, the SMF and AMF can include a selected and/or allowed PDU session ID in the PDU session establishment accept message. In addition, the SMF and AMF can indicate a PDU session type indicating the type of a selected and/or allowed PDU session. As the PDU session type, as described above, any of IPv4, IPv6, IP, Ethernet, and Unstructured can be indicated. In addition, the SMF and AMF can include the SSC mode of the selected and/or allowed PDU session in the PDU session establishment accept message.

Furthermore, the SMF and AMF can include an approved QoS rule group in the PDU session establishment accept message. Note that the approved QoS rule group may include one or multiple QoS rules. Furthermore, in the present procedure, in a case that multiple QoS flows and/or user plane radio bearers are established, multiple QoS rules may be included in the approved QoS rule group. Conversely, in the present procedure, in a case that only one QoS flow and/or user plane radio bearer is established, single QoS rule may be included in the approved QoS rule group.

Furthermore, the SMF may transmit information indicating that some requests of the UE have been rejected included in the PDU session establishment accept message, or by transmitting information indicating that some requests of the UE have been rejected, may indicate a reason why some requests of the UE have been rejected. Furthermore, by receiving information indicating that some requests of the UE have been rejected, the UE may recognize the reason why some requests of the UE have been rejected. Note that the reason for rejection may be information indicating that the content indicated by the identification information received by the SMF is not allowed.

The UE receives the NAS message including the PDU session establishment accept message from the AMF via the N1 interface (S912). The UE may transmit a PDU session establishment complete message to the SMF via the AMF, based on the reception of the PDU session establishment accept message and/or the NAS message including the PDU session establishment accept message (S914) (S916). The UE can detect that the request of the UE by the PDU session establishment request has been accepted by receiving the PDU session establishment accept message.

Specifically, the UE transmits the PDU session establishment complete message to the AMF via the N1 interface (S914). The AMF receives the PDU session establishment complete message from the UE, and then transmits the PDU session establishment complete message to the SMF via the N11 interface (S916).

Note that the PDU session establishment complete message transmitted from the AMF to the SMF may be a response message to the PDU session establishment accept message that has been transmitted from the SMF to the AMF in S910. Furthermore, the PDU session establishment complete message may be a NAS message. Furthermore, the PDU session establishment complete message may be a message indicating that the PDU session establishment procedure completes.

The SMF receives the PDU session establishment complete message from the AMF via the N11 interface (S916), and then can perform a second condition determination. The second condition determination is to determine a type of the message on the N4 interface to be transmitted and/or received. In a case that the second condition determination is true, the SMF transmits a session modification request message to the UPF via the N4 interface (S918), and then receives a session modification accept message transmitted from the UPF as the response message thereto (S920). In a case that the second condition determination is false, the SMF transmits the session establishment request message to the UPF via the N4 interface (S918), and then receives the session modification accept message transmitted from the UPF as the response message thereto (S920).

Note that the second condition determination may be performed based on whether the session on the N4 interface for the PDU session has been established. For example, in a case that the session on the N4 interface for the PDU session has been established, the second condition determination may be true, and in a case that the session on the N4 interface for the PDU session is not established, the second condition determination may be false. Conditions for determining true or false of the second condition determination need not be limited to the above-described conditions.

Each apparatus completes the procedure of (A) in the PDU session establishment procedure, based on the transmission and/or reception of the PDU session establishment complete message, and/or the transmission and/or reception of a session modification response message, and/or the transmission and/or reception of the session establishment response message. In a case that the procedure of (A) in the present procedure is completed, the UE is in a state in which the PDU session to the DN has been established. Here, in a case that the PDU session establishment procedure is the PDU session establishment procedure for establishing the PDU session for LADN, each apparatus may establish the PDU session for LADN based on the completion of the procedure of (A) in the present procedure.

Next, each step of the procedure of (B) in the PDU session establishment procedure will be described. The SMF transmits a PDU session establishment reject message to the UE via the AMF (S922) (S924). Specifically, the SMF transmits the PDU session establishment reject message to the AMF via the N11 interface (S922). The AMF receives the PDU session establishment request message from the SMF via the N11 interface (S922), and then transmits the PDU session establishment reject message to the UE using the N1 interface (S924).

Note that the PDU session establishment reject message may be a NAS message, or may be an SM message transmitted from the SMF to the UE. In addition, the PDU session establishment reject message may be a message indicating that the PDU session establishment has been rejected. Furthermore, the PDU session establishment reject message may be transmitted and/or received included in the MM message via the N1 interface. Furthermore, the MM message may be the NAS message, or may be a downlink NAS transport (DL NAS TRANSPORT) message. Here, a case that the expression "identification information and/or a value is included in the PDU session establishment reject message" is used may mean that they are included in the MM message including the PDU session establishment reject message.

Here, the SMF may indicate that the request of the UE by the PDU session establishment request has been rejected by transmitting the PDU session establishment reject message. Furthermore, the SMF may transmit information indicating a reason for rejection included in the PDU session establishment reject message, or may indicate the reason for rejection by transmitting the reason for rejection. Furthermore, by receiving the information indicating the reason why the request of the UE has been rejected, the UE may recognize the reason why the request of the UE has been rejected. Note that the reason for rejection may be information indicating that the content indicated by the identification information received by the SMF is not allowed.

The SMF and/or the AMF may transmit at least the 41st identification information and/or a backoff timer value included in the PDU session establishment reject message, or by transmitting the 41st identification information and/or the backoff timer value, may indicate that the request of the UE has been rejected, or may indicate the reason why the request of the UE has been rejected.

Furthermore, by transmitting the 41st identification information, the SMF and/or the AMF may indicate that the establishment request of the PDU session for LADN has been rejected, or may indicate that the PDU session for LADN is not established. Furthermore, the SMF and/or AMF may indicate that the UE is located outside the LADN service, or may indicate that, in the current area, the PDU session for LADN cannot be established. Furthermore, by transmitting the 41st identification information, the SMF and/or the AMF may indicate that the LADN information held by the UE is not valid, or may indicate that it is necessary to update the LADN information held by the UE. Here, the LADN service area may be a LADN service area correlated to the LADN DNN requested by the UE.

Furthermore, by transmitting the backoff timer value, the SMF and/or the AMF may indicate to the UE to configure the backoff timer value to a value to be transmitted, or may indicate that a backoff timer configured with the transmitted value is initiated.

Furthermore, in a case that the 41st identification information is information indicating that the UE is located outside the LADN service area, the SMF and/or the AMF may not include the backoff timer value in the PDU session establishment reject message. In other words, in a case that the 41st identification information is information other than the information indicating that the UE is located outside the LADN service area, the SMF and/or the AMF may include the backoff timer value in the PDU session establishment reject message.

Here, in a case of having transmitted the 41st identification information, the network apparatus may indicate to the UE to delete the LADN information stored in the UE, or may indicate to delete the LADN DNN requested by the UE from the LADN information stored in the UE. Furthermore, in the case of having transmitted the 41st identification information, the network apparatus may indicate to the UE that the LADN DNN requested by the UE is invalid, or may indicate to deactivate the LADN DNN requested by the UE.

Furthermore, in the case of having transmitted the 41st identification information, the network apparatus may indicate to the UE to recognize that the LADN DNN provided in the PDU session establishment procedure is invalid, or may indicate to deactivate the LADN DNN provided in the PDU session establishment procedure.

Furthermore, in the case of having transmitted the 41st identification information, the network apparatus may perform the registration procedure after the completion of the present procedure, or may initiate a UE configuration update procedure (Generic UE configuration update procedure). Note that the registration procedure may be the registration procedure for mobility and registration update. Furthermore, the registration procedure may be a procedure for providing the new LADN information to the UE. Furthermore, the UE configuration update procedure may be a procedure initiated by the AMF transmitting a Configuration update command message to the UE, and may be a procedure for providing the new LADN information to the UE.

In other words, in a case that a transmitted 5GSM cause value is a cause value indicating that the UE is located outside the LADN service, the network apparatus may indicate to the UE to delete the LADN information stored in the UE, or may indicate to the UE to delete the LADN DNN requested by the UE from the LADN information stored in the UE. Furthermore, in a case that the transmitted 5GSM cause value is a cause value indicating that the network apparatus is located outside the LADN service, the network apparatus may indicate to the UE that the LADN DNN requested by the network apparatus is invalid, or may indicate to deactivate the LADN DNN requested by the UE.

Furthermore, in the case that the transmitted 5GSM cause value is the cause value indicating that the UE is located outside the LADN service, the network apparatus may indicate to the UE to recognize that the LADN DNN provided in the PDU session establishment procedure is invalid, or may indicate to deactivate the LADN DNN provided in the PDU session establishment procedure.

Furthermore, in the case that the transmitted 5GSM cause value is the cause value indicating that the UE is located outside the LADN service, the network apparatus may perform the registration procedure after the completion of the present procedure, or may initiate the UE configuration update procedure (Generic UE configuration update procedure). Note that the registration procedure may be the registration procedure for mobility and registration update. Furthermore, the registration procedure may be a procedure for providing the new LADN information to the UE. Furthermore, the UE configuration update procedure may be a procedure initiated by the AMF transmitting a Configuration update command message to the UE, and may be a procedure for providing the new LADN information to the UE.

Note that the SMF and the AMF may select and determine whether or not to include at least the 41st identification information in the PDU session establishment reject message, based on each piece of the received identification information, and/or subscriber information, and/or network capability information, and/or an operator policy, and/or a network state, and/or user registration information, and/or a context held by the AMF, and/or the like. Specifically, in a case that the UE is located outside the LADN service area, the SMF and/or the AMF may include the 41st identification information in the PDU session establishment reject message. Note that the LADN service area may be a LADN service area correlated to the LADN DNN requested by the UE.

By receiving the PDU session establishment reject message, the UE can recognize that the request of the UE by the PDU session establishment request has been rejected, and the contents of various types of identification information included in the PDU session establishment reject message.

Figure 7:
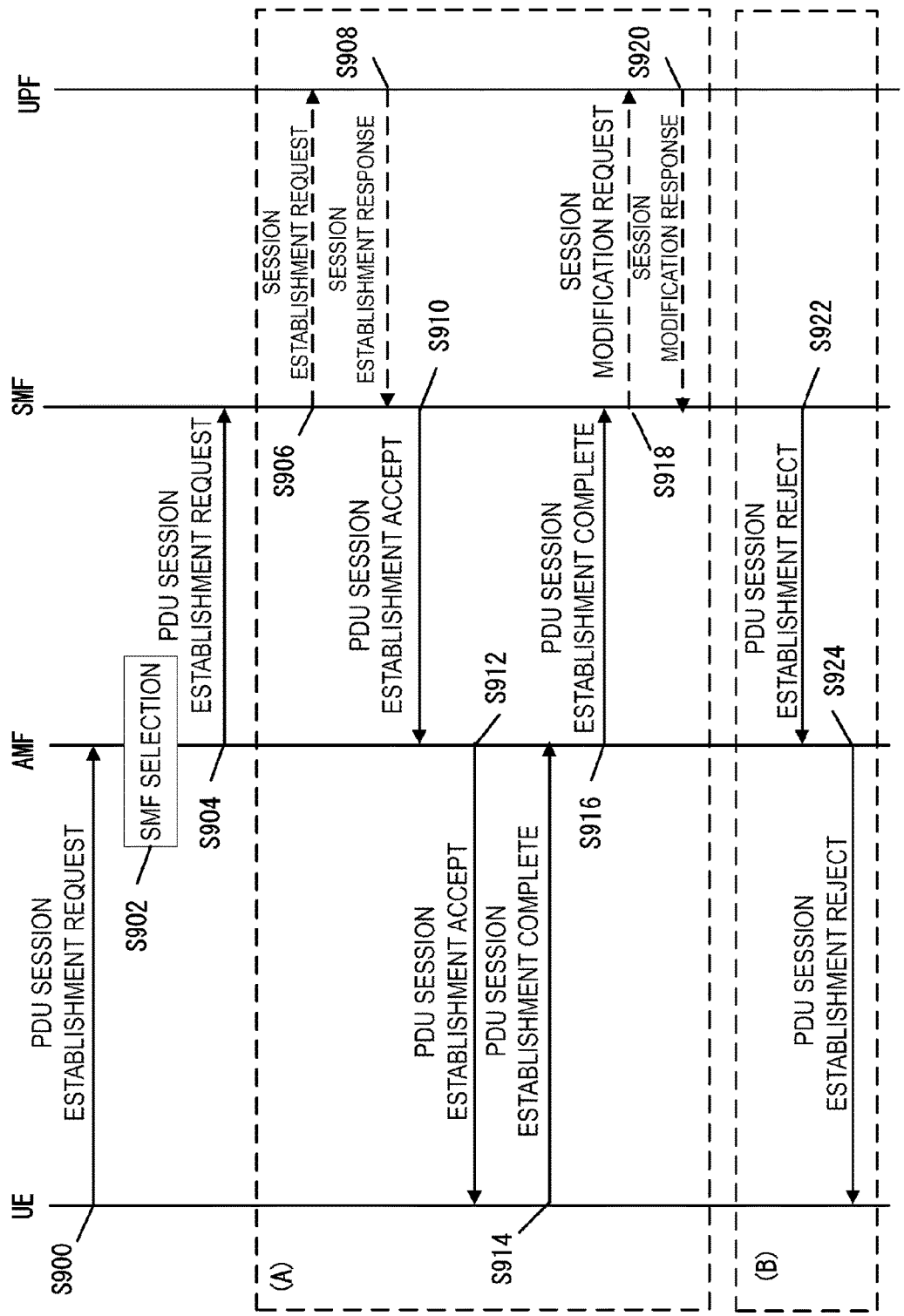
FIG. 7 is a diagram illustrating a PDU session establishment procedure.

Each apparatus completes the PDU session establishment procedure, based on completion of the procedure of (A) or (B) in FIG. 7. Note that each apparatus may transition to a state in which the PDU session is established, based on the completion of the procedure of (A) in FIG. 7, may recognize that the PDU session establishment procedure has been rejected, or may transition to a state in which the PDU session is not established, based on the completion of the procedure of (B) in FIG. 7. In addition, the UE can communicate with the DN using the established PDU session by the completion of the procedure of (A) in FIG. 7.

Furthermore, each apparatus may perform processing based on information transmitted and/or received in the PDU session establishment procedure, based on completion of the PDU session establishment procedure. For example, in a case of having transmitted and/or received information indicating that some requests of the UE have been rejected, each apparatus may recognize a reason why the request of the UE has been rejected. In addition, each apparatus may perform the present procedure again, based on the reason why the request of the UE has been rejected, or may perform the PDU session establishment procedure for another cell.

Furthermore, based on the completion of the PDU session establishment procedure, the UE may store identification information received along with the PDU session establishment accept message and/or the PDU session establishment reject message, or may recognize the determination of the network.

For example, in a case of having transmitted and/or received the 36th identification information, each apparatus may establish a PDU session correlated to the DNN indicated by the 36th identification information. Furthermore, in a case of having received the 36th identification information, the UE may recognize that the PDU session correlated to the DNN indicated by the 36th identification information is established. Furthermore, in the case of having received the 36th identification information, the UE may recognize the DNN selected and determined by the network. Note that the 36th identification information may be a DNN for identifying a DN that supports one or multiple functions indicated by the identification information transmitted and/or received along with the 36th identification information. In addition, the 36th identification information may be the DNN received in the registration procedure, or may be the LADN.

Furthermore, in a case of having received the backoff timer value, the UE may configure the backoff timer value to the backoff timer, or may initiate the backoff timer configured with the received backoff timer value. Here, even in the case of having received the backoff timer value, in a case of having received the 41st identification information, the UE may ignore the received backoff timer value, and may not initiate the backoff timer. Conversely, even in a case of having received the backoff timer value and the 41st identification information, the UE may configure the received backoff timer value to the backoff timer, and may initiate the backoff timer configured with the received backoff timer value.

Specifically, in a case of having received the 41st identification information indicating that the UE is located outside the LADN service area, the UE may ignore the received backoff timer value, or may not initiate the backoff timer. Conversely, in a case of having received the 41st identification information indicating other than that the UE is located outside the LADN service area, the UE may configure the received backoff timer value to the backoff timer, or may initiate the backoff timer configured with the received backoff timer value.

Furthermore, in a case of having received the 41st identification information, after the completion of the present procedure, based on the completion of the present procedure and/or the reception of the 41st identification information, the UE may initiate the PDU session establishment procedure under other conditions. Note that in a case that the UE is performing a back-timer, the PDU session establishment procedure may be initiated under other conditions after the count of the backoff timer expires.

Here, the fact that the UE initiates the PDU session establishment procedure under other conditions may be, for example, that the UE initiates the PDU session establishment procedure by configuring the LADN DNN different from the previously transmitted LADN DNN to the DNN information element and transmitting to the network, or that the UE initiates the PDU session establishment procedure by changing the area in which the UE is located and then the transmitting the PDU session establishment request message, or that the UE initiates the PDU session establishment procedure by reflecting change in combination of these. Note that the UE may configure the LADN DNN re-selected from the LADN information stored by the UE to the DNN information element.

Alternatively, the fact that the UE initiates the PDU session establishment procedure under other conditions may be that the UE initiates the PDU session establishment procedure without using the LADN DNN. Specifically, by transmitting the LADN DNN without including in the PDU session establishment request message, the UE may request a PDU session for other than the 5GLAN.

In the case of having received the 41st identification information, after the completion of the present procedure, the UE may transition to a not-initiated state, a stopped state, or a prohibited state, of the PDU session establishment procedure using the LADN DNN requested by the UE. Here, the PDU session establishment procedure using the LADN DNN requested by the UE may be a PDU session establishment procedure initiated by transmitting the PDU session establishment request message including the LADN DNN previously requested by the UE. In other words, in the case of having received the 41st identification information, the UE may be prohibited from performing a PDU session establishment procedure using the same LADN DNN, or may be prohibited from transmitting a PDU session establishment request message including the same LADN DNN.

In the case of having received the 41st identification information, in a period until a state change of the UE occurs after the completion of the present procedure, the UE may be prohibited from transmitting the PDU session establishment request message including the same LADN DNN in the same PLMN. Here, the state change of the UE may be that the power source of the UE is turned off or that the USIM is removed. Furthermore, the state change of the UE may be that the information held by the UE is updated. Here, the information held by the UE may be the LADN information. Furthermore, the updating of the information held by the UE may be performed by the registration procedure, or may be performed by the UE configuration update procedure.

In other words, in the case of having received the 41st identification information, in a period until the registration procedure or the UE configuration update procedure is performed after the completion of the present procedure, the UE may be prohibited from performing a PDU session establishment procedure for the same LADN in the same PLMN, or may be prohibited from transmitting the PDU session establishment request message for initiating the PDU session establishment procedure. Furthermore, in other words, in the case of having received the 41st identification information, in a period until the registration procedure or the UE configuration update procedure is performed after the completion of the present procedure, the UE may be prohibited from transmitting the PDU session establishment request message including the same LADN DNN in the same PLMN.

In the case of having received the 41st identification information, after the completion of the present procedure, the UE may transition to a state in which transmission of the PDU session establishment request message including the same LADN DNN is prohibited for a certain period of time, or may transition to a state in which transmission of the PDU session establishment request message including the same LADN DNN in the same PLMN is prohibited, or may transition to a state in which transmission of the PDU session establishment request message including the same LADN DNN in the same area is prohibited. Here, the certain period may be a period configured by the backoff timer value, or may be a period configured by another network or the UE.

In the case of having received the 41st identification information, the UE may delete the stored LADN information, or may delete the LADN DNN requested by the UE, from the stored LADN information. Furthermore, in the case of having received the 41st identification information, the UE may recognize that the LADN DNN requested by the UE is invalid, or may deactivate the LADN DNN requested by the UE.

In other words, in the case of having received the 41st identification information, the UE may recognize that the LADN DNN provided in the PDU session establishment procedure is invalid, or may deactivate the LADN DNN provided in the PDU session establishment procedure.

Furthermore, in the case of having received the 41st identification information, the UE may initiate the registration procedure. Note that the registration procedure may be the registration procedure for mobility and registration update. Furthermore, the registration procedure may be a procedure for requesting the new LADN information. Furthermore, in a case of having received the LADN information in the registration procedure, the UE may store the received LADN information.

In other words, in the case of having received the 41st identification information, the UE may request the LADN information. Here, the LADN information may be LADN information for the LADN DNN provided in the PDU session establishment procedure.

In other words, in a case that a received 5GSM cause value is a cause value indicating that the UE is located outside the LADN service, the UE may delete the stored LADN information, or may delete the LADN DNN requested by the UE, from the stored LADN information. Furthermore, in the case that the received 5GSM cause value is the cause value indicating that the UE is located outside the LADN service, the UE may recognize that the LADN DNN requested by the UE is invalid, or may deactivate the LADN DNN requested by the UE.

In other words, in the case that the received 5GSM cause value is the cause value indicating that the UE is located outside the LADN service, the UE may recognize that the LADN DNN provided in the PDU session establishment procedure is invalid, or may deactivate the LADN DNN provided in the PDU session establishment procedure.

Note that a case that the expression "delete the LADN DNN" is used may mean deleting the information indicating the LADN configured by the LADN DNN, or may mean deleting the LADN information including the LADN DNN. In addition, a case that the expression "recognize that the LADN DNN is invalid" is used may mean recognizing that information indicating the LADN configured by the LADN DNN is invalid, or may mean recognizing that the LADN information including the LADN DNN is invalid. In addition, a case that the expression "deactivate the LADN DNN" is used may mean deactivating the information indicating the LADN configured by the LADN DNN, or may mean deactivating the LADN information including the LADN DNN.

Furthermore, in the case that the received 5GSM cause value is the cause value indicating that the UE is located outside the LADN service, the UE may initiate the registration procedure. More specifically, in the case that the received 5GSM cause value is the cause value indicating that the UE is located outside the LADN service, the UE may initiate the registration procedure based on a request from a higher layer and/or an indication of a user.

Note that the registration procedure may be the registration procedure for mobility and registration update. Furthermore, the registration procedure may be a procedure for requesting the new LADN information. Furthermore, in a case of having received the LADN information in the registration procedure, the UE may store the received LADN information. Note that in the registration procedure, by transmitting the registration request message including the second identification information, the UE may request new LADN information, or may acquire the LADN information from the network. Furthermore, in the registration procedure, even in a case that the registration request message not including the second identification information has been transmitted, the UE may acquire the LADN information from the network.

Here, the UE may initiate the registration procedure in order to synchronize the network and the LADN information. Furthermore, the UE may initiate the registration procedure in order to avoid failure due to being located outside the LADN service area.

In other words, in the case that the received 5GSM cause value is the cause value indicating that the UE is located outside the LADN service, the UE may request the LADN information. Here, the LADN information may be LADN information for the LADN DNN provided in the PDU session establishment procedure.

4. First Embodiment

Next, a first embodiment will be described. Hereinafter, the first embodiment is referred to as the present embodiment. In a communication procedure of the present embodiment, first, each apparatus carries out a registration procedure initiated by a UE. Next, each apparatus establishes a PDU session by performing a PDU session establishment procedure initiated by the UE, and transitions to a state in which communication using the PDU session can be performed between the UE and a DN. Next, each apparatus transmits and/or receives user data using the PDU session. The procedure according to the present embodiment is completed as described above.

Note that in the procedure according to the present embodiment, each apparatus may exchange support information for expansion of the LADN service area and/or LADN information between the UE and the network, in the registration procedure.

Furthermore, each apparatus may establish a PDU session for LADN between the UE and the network, based on information exchanged in the registration procedure, in the PDU session establishment procedure. Note that the PDU session for LADN may be a PDU session which can be established only in a case that the UE is located in a specific area. Here, the specific area may be, for example, the LADN service area.

Furthermore, each apparatus may perform communication of user data with the LADN by using the established PDU session. Furthermore, based on updating of the LADN information and/or a state change of the LADN service area, each apparatus may release the PDU session which has been established, or may release a user plane resource associated with the PDU session which has been established.

Furthermore, in a case that the request for the PDU session establishment procedure is rejected, each apparatus may not establish a PDU session. In this case, each apparatus may perform processing based on information included in the PDU session establishment reject message after the completion of the PDU session establishment procedure, or may complete the procedure according to the present embodiment by performing processing based on information included in the PDU session establishment reject message.

5. Modified Examples

A program running on an apparatus according to the present invention may serve as a program that controls a Central Processing Unit (CPU) and the like to cause a computer to operate in such a manner as to realize the functions of the above-described embodiment according to the present invention. Programs or information handled by the programs are temporarily stored in a volatile memory such as a Random Access Memory (RAM), a non-volatile memory such as a flash memory, a Hard Disk Drive (HDD), or another storage device system.

Note that a program for realizing such functions of the embodiment of the present invention may be recorded on a computer-readable recording medium. The functions may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or may be a processor of a known type, a controller, a micro-controller, or a state machine instead. The above-mentioned electric circuit may include a digital circuit, or may include an analog circuit. In a case that with advances in semiconductor technology, a circuit integration technology appears that replaces the present integrated circuits, one or multiple aspects of the present invention are also possible to use a new integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

The invention claimed is:

1. A User Equipment (UE) comprising:
transmitting and receiving circuitry configured to:
 transmit, to a control device in a core network, a registration request message including a Local Area Data Network (LADN) indication Information Element (IE); and
 receive, from the control device, a registration accept message including a LADN information IE, and
a controller,
wherein
 in a case that there exists one or more LADN Data Network Names (DNNs) which are included in the LADN indication IE and not included in the LADN information IE, the controller considers the one or more LADN DNNs as not available.

2. A control device in a core network comprising:
transmitting and receiving circuitry configured to:
 receive, from a User Equipment (UE), a registration request message including a Local Area Data Network (LADN) indication Information Element (IE); and
 transmit, to the UE, a registration accept message including a LADN information IE, wherein
the LADN indication IE includes one or more LADN Data Network Names (DNNs), and
the control device indicates, to the UE, that the one or more LADN DNNs are not available, by not including the one or more LADN DNNs in the LADN information IE.

3. A communication control method performed by a User Equipment (UE), the communication control method comprising:
 transmitting, to a control device in a core network, a registration request message including a Local Area Data Network (LADN) indication Information Element (IE); and
 receiving, from the control device, a registration accept message including a LADN information IE,
wherein
 in a case that there exists one or more LADN Data Network Names (DNNs) which are included in the LADN indication IE and not included in the LADN information IE, the UE considers the one or more LADN DNNs as not available.

4. A communication control method performed by a control device in a core network, the communication control method comprising:
 receiving, from a User Equipment (UE), a registration request message including a Local Area Data Network (LADN) indication Information Element (IE); and
 transmitting, to the UE, a registration accept message including a LADN information IE, wherein
the LADN indication IE includes one or more LADN Data Network Names (DNNs), and
the control device indicates, to the UE, that the one or more LADN DNNs are not available, by not including the one or more LADN DNNs in the LADN information IE.

5. A User Equipment (UE) comprising:
transmitting and receiving circuitry configured to:
 transmit, to a control device in a core network, a registration request message including a Local Area Data Network (LADN) indication Information Element (IE); and
 receive, from the control device, a registration accept message including a LADN information IE, and
a controller,
wherein
 in a case that there exists a LADN Data Network Name (DNN) which is included in the LADN indication IE and not included in the LADN information IE, the controller considers the LADN DNN as not available.

6. A control device in a core network comprising:
transmitting and receiving circuitry configured to:
 receive, from a User Equipment (UE), a registration request message including a Local Area Data Network (LADN) indication Information Element (IE); and
 transmit, to the UE, a registration accept message including a LADN information IE, wherein
the LADN indication IE includes a LADN Data Network Name (DNN), and
the control device indicates, to the UE, that the LADN DNN is not available, by not including the LADN DNN in the LADN information IE.

7. A communication control method performed by a User Equipment (UE), the communication control method comprising:
 transmitting, to a control device in a core network, a registration request message including a Local Area Data Network (LADN) indication Information Element (IE); and receiving, from the control device, a registration accept message including a LADN information IE, wherein in a case that there exists a LADN Data Network Name (DNN) which is included in the LADN indication IE and not included in the LADN information IE, the UE considers the LADN DNN as not available.

8. A communication control method performed by a control device in a core network, the communication control method comprising:

receiving, from a User Equipment (UE), a registration request message including a Local Area Data Network (LADN) indication Information Element (IE); and transmitting, to the UE, a registration accept message including a LADN information IE, wherein the LADN indication IE includes a LADN Data Network Name (DNN), and the control device indicates, to the UE, that the LADN DNN is not available, by not including the LADN DNN in the LADN information IE.

\* \* \* \* \*